(12) United States Patent
Gomi

(10) Patent No.: US 12,335,253 B2
(45) Date of Patent: Jun. 17, 2025

(54) TERMINAL DEVICE, AUTHENTICATION SERVER, AUTHENTICATION METHOD, AND NON-TRANSITORY COMPUTER READABLE STORAGE MEDIUM

(71) Applicant: Yahoo Japan Corporation, Tokyo (JP)

(72) Inventor: Hidehito Gomi, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 209 days.

(21) Appl. No.: 17/688,681

(22) Filed: Mar. 7, 2022

(65) Prior Publication Data
US 2022/0377063 A1 Nov. 24, 2022

(30) Foreign Application Priority Data

May 19, 2021 (JP) ................................ 2021-084967

(51) Int. Cl.
*H04L 29/06* (2006.01)
*H04L 9/40* (2022.01)

(52) U.S. Cl.
CPC ................................. *H04L 63/083* (2013.01)

(58) Field of Classification Search
CPC ... H04L 63/083; H04L 9/3231; H04L 9/3247; H04L 9/3271; H04L 63/126
See application file for complete search history.

(56) References Cited

U.S. PATENT DOCUMENTS

| 10,992,670 | B1* | 4/2021 | Drooger | H04L 63/0428 |
| 11,868,485 | B2* | 1/2024 | Zhang | H04L 9/302 |
| 2017/0279789 | A1* | 9/2017 | Miao | H04L 63/083 |
| 2019/0052468 | A1* | 2/2019 | Ngoc-Ai Lu | H04L 9/008 |
| 2020/0045046 | A1* | 2/2020 | Nowak | H04L 63/0892 |
| 2021/0312734 | A1* | 10/2021 | Bajaj | H04L 9/14 |

(Continued)

FOREIGN PATENT DOCUMENTS

| JP | 2017-167875 A | 9/2017 |
| JP | 2020-141331 A | 9/2020 |

OTHER PUBLICATIONS

Sun et al., "An Identity-Based Security System for User Privacy in Vehicular Ad Hoc Networks", IEEE Transactions On Parallel and Distributed Systems, vol. 21, No. 9, September (Year: 2010).*

(Continued)

*Primary Examiner* — Morshed Mehedi
(74) *Attorney, Agent, or Firm* — Procopio, Cory, Hargreaves & Savitch LLP

(57) ABSTRACT

A terminal device according to the present application includes a sending unit that sends a challenge to an authenticator, a reception unit that receives the challenge with a signature and a public key from the authenticator, a verification unit that performs signature verification using the public key, and a providing unit that provides a verification result of the signature to an authentication server. Further, an authentication server according to the present application includes a sending unit that makes an authentication request to a terminal device, an acquisition unit that receives, from the terminal device, a verification result of a signature generated by an authenticator together with an ID and a password of a user, and a verification unit that determines that FIDO authentication is completed with the verification result of the signature, and verifies the ID and the password of the user.

14 Claims, 11 Drawing Sheets

(56) References Cited

U.S. PATENT DOCUMENTS

| | | | |
|---|---|---|---|
| 2022/0147600 A1* | 5/2022 | Funayama | H04L 63/0823 |
| 2022/0255931 A1* | 8/2022 | Avetisov | H04L 9/3263 |
| 2023/0412400 A1* | 12/2023 | Fürstner | H04L 63/0853 |

OTHER PUBLICATIONS

JPO; Notification of Reason for Refusal issued in Japanese Patent Application No. 2021-084967; mailed Feb. 1, 2022; 17 Pages.

Tsurumaki et al; "A Study on Key Re-registration due to Change of Device for Mobile-Device-based Public Key Authentication" Fujitsu, Japan, Fujitsu Limited, Jul. 1, 2019, vol. 70, No. 3, pp. 54-61.

Nishimura et al; "A Study on Key Re-registration due to Change of Device for Mobile-Device-based Public Key Authentication" The Institute of Electronics, Information and Communication Engineers (IEICE) Technical Report, Japan, IEICE, Feb. 22, 2018, vol. 117, No. 460, pp. 69-74.

* cited by examiner

| USER ID | AGE | GENDER | HOME | WORK PLACE | INTEREST | ... |
|---|---|---|---|---|---|---|
| U1 | TWENTIES | MALE | LC11 | LC12 | SPORTS | ... |
| U2 | TWENTIES | FEMALE | LC21 | LC22 | GOURMAND | ... |
| U3 | THIRTIES | MALE | LC31 | LC32 | MOVIE | ... |
| U4 | TWENTIES | MALE | LC41 | LC42 | BOOK | ... |
| U5 | THIRTIES | FEMALE | LC51 | LC52 | TRAVEL | ... |
| ... | ... | ... | ... | ... | ... | ... |

FIG.8

| USER ID | POSITION HISTORY | SEARCH HISTORY | BROWSING HISTORY | PURCHASE HISTORY | POST HISTORY | |
|---|---|---|---|---|---|---|
| U1 | POSITION HISTORY #1 | SEARCH HISTORY #1 | BROWSING HISTORY #1 | PURCHASE HISTORY #1 | POST HISTORY #1 | ⋮ |
| U2 | POSITION HISTORY #2 | SEARCH HISTORY #2 | BROWSING HISTORY #2 | PURCHASE HISTORY #2 | POST HISTORY #2 | ⋮ |
| U3 | POSITION HISTORY #3 | SEARCH HISTORY #3 | BROWSING HISTORY #3 | PURCHASE HISTORY #3 | POST HISTORY #3 | ⋮ |
| U4 | POSITION HISTORY #4 | SEARCH HISTORY #4 | BROWSING HISTORY #4 | PURCHASE HISTORY #4 | POST HISTORY #4 | ⋮ |
| U5 | POSITION HISTORY #5 | SEARCH HISTORY #5 | BROWSING HISTORY #5 | PURCHASE HISTORY #5 | POST HISTORY #5 | ⋮ |
| ⋮ | ⋮ | ⋮ | ⋮ | ⋮ | ⋮ | ⋮ |

| USER ID | PASSWORD | ... |
|---|---|---|
| U1 | PASSWORD #1 | ... |
| U2 | PASSWORD #2 | ... |
| U3 | PASSWORD #3 | ... |
| U4 | PASSWORD #4 | ... |
| U5 | PASSWORD #5 | ... |
| ... | ... | ... |

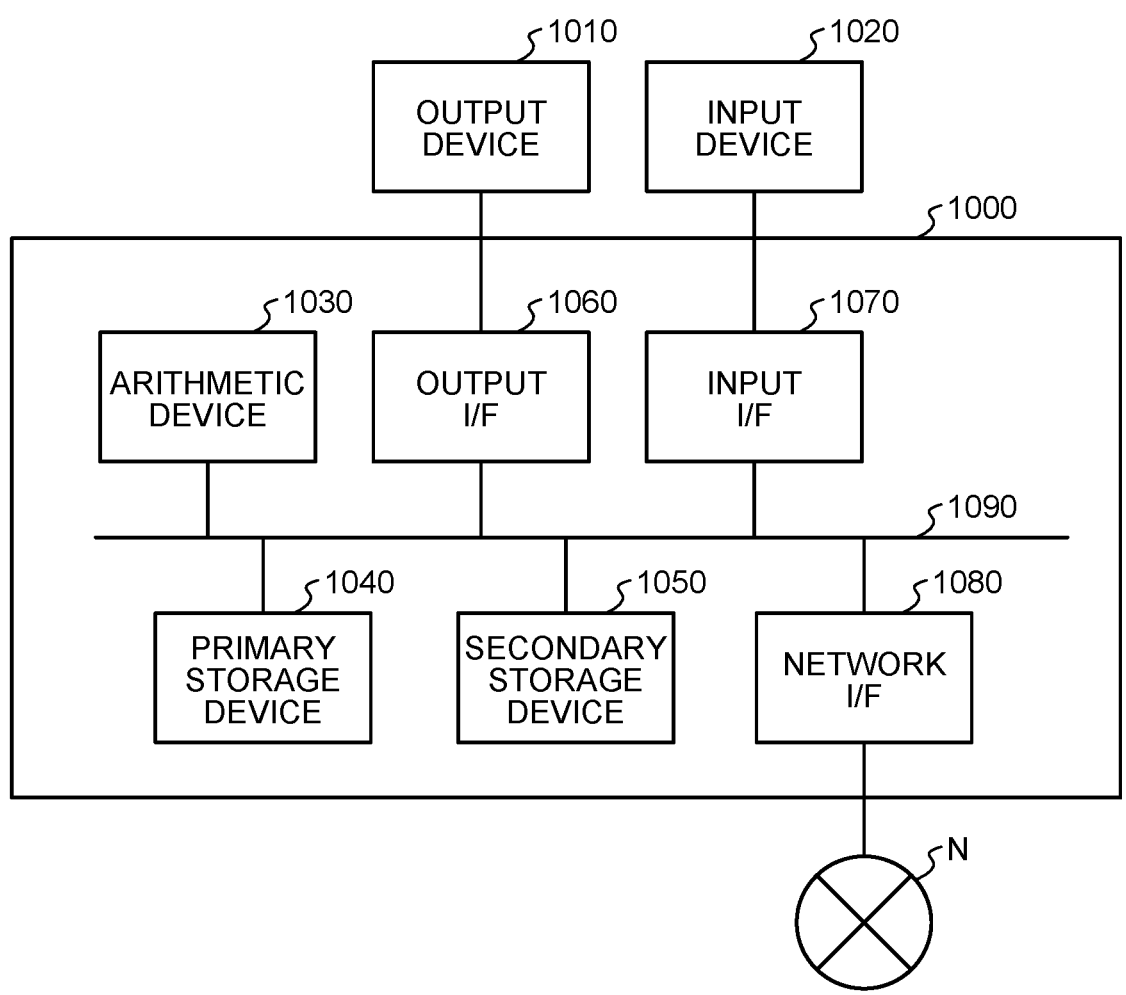

TERMINAL DEVICE, AUTHENTICATION SERVER, AUTHENTICATION METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2021-084967 filed in Japan on May 19, 2021.

BACKGROUND OF THE INVENTION

1. Field of the Invention

The present invention relates to a terminal device, an authentication server, an authentication method, and an authentication program.

2. Description of the Related Art

A technique related to Fast Identity Online (FIDO) and using an authenticator is disclosed (See JP 2020-141331 A).

However, the above-described related art does not consider an authentication method in which FIDO authentication for using an external website, and password authentication coexist without modifying an existing interface for password authentication.

SUMMARY OF THE INVENTION

A terminal device includes a sending unit that sends a challenge to an authenticator; a reception unit that receives the challenge with a signature and a public key from the authenticator; a verification unit that performs signature verification using the public key; and a providing unit that provides a verification result of the signature to an authentication server.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of a user information database;

FIG. 8 is a diagram illustrating an example of a history information database;

FIG. 9 is a diagram illustrating an example of an authentication information database;

FIG. 11 is a diagram illustrating an example of a hardware configuration.

DETAILED DESCRIPTION OF THE PREFERRED EMBODIMENTS

Hereinafter, modes (Hereinafter, it is described as an "embodiment".) for implementing a terminal device, an authentication server, an authentication method, and an authentication program according to the present application will be described in detail with reference to the drawings. Note that the terminal device, the authentication server, the authentication method, and the authentication program according to the present application are not limited by the embodiments. Further, in the following embodiments, the same parts are denoted by the same reference marks, and redundant description will be omitted.

1. Outline of Authentication Method

Figure 1:
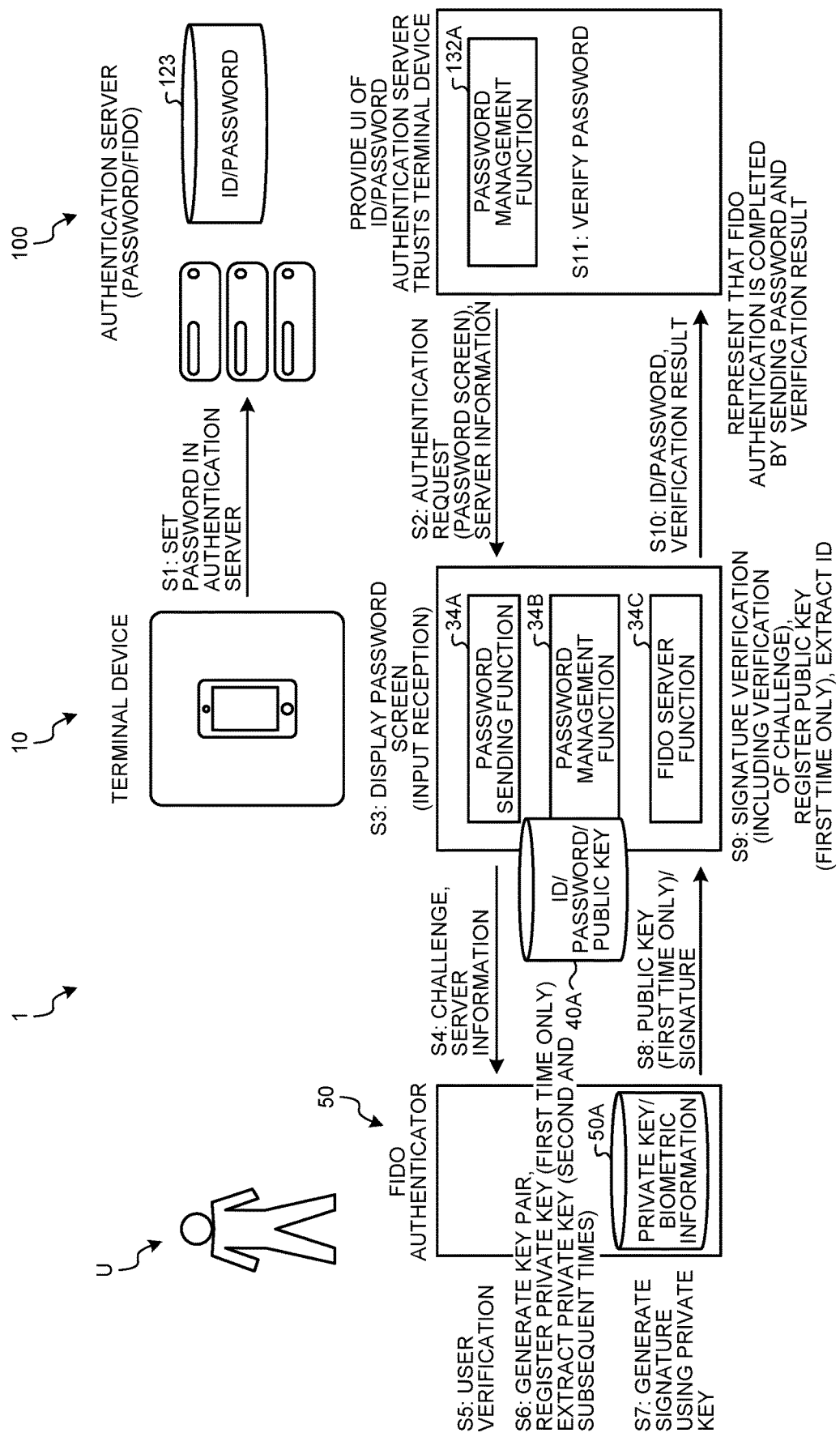
FIG. 1 is an explanatory diagram illustrating an outline of an authentication method according to an embodiment, and a first example.

First, an outline of an authentication method according to an embodiment will be described with reference to FIG. 1. FIG. 1 is an explanatory diagram illustrating an outline of an authentication method according to an embodiment, and a first example. Note that, in FIG. 1, a case where a Fast Identity Online (FIDO) authentication function is provided without modifying an interface for password authentication in an authentication server in which FIDO authentication for accessing an external server and password authentication coexist will be described as an example.

As illustrated in FIG. 1, an authentication system 1 includes a terminal device 10, a FIDO authenticator 50, and an authentication server 100. The terminal device 10 and the authentication server 100 are connected to each other so as to be able to communicate with each other in a wired or wireless manner via a network N (See FIG. 4.). In the present embodiment, the terminal device 10 cooperates with the FIDO authenticator 50. Note that, although the FIDO authenticator 50 is depicted as being physically different from the terminal device 10 in FIG. 1, the FIDO authenticator 50 may be actually incorporated in the terminal device 10.

The terminal device 10 is a client device used by a user U (user). For example, the terminal device 10 is a smart device such as a smartphone or a tablet, and is a portable terminal device capable of communicating with an arbitrary server device via a wireless communication network such as 4G (Generation) or Long Term Evolution (LTE). Further, the terminal device 10 includes a screen such as a liquid crystal display and having a touch panel function, and receives various operations on display data such as content from the user U, such as a tap operation, a slide operation, and a scroll operation with a finger, a stylus, or the like. Note that an operation performed on a region of the screen where the content is displayed may be an operation on the content. Furthermore, the terminal device 10 may be not only a smart device but also an information processing device such as a desktop personal computer (PC) or a laptop PC.

A FIDO-compatible password manager (FIDO-enabled Password Manager) is implemented in the terminal device 10 according to the present embodiment, and functions as a FIDO authentication server instead of the authentication server 100. In the FIDO authentication, the identity of a user is verified by an authenticator built in or externally attached to a client device such as a smartphone. In the present embodiment, the identity of the user U is verified by an authenticator built in or externally attached to the terminal device 10 of the user U.

Some existing password managers apply FIDO authentication using a screen lock as an authentication means for starting use of the password manager. However, this is local authentication (screen unlocking) in the terminal device, and does not perform FIDO authentication for using another website. The FIDO-compatible password manager according to the present embodiment realizes an authentication method in which FIDO authentication for accessing an external server and password authentication coexist. Note that FIDO is merely an example. Actually, the authentication method is not limited to FIDO, and may be any authentication method as long as the authentication method is a type in which information of a verification result verified locally by the user is notified to a remote server, and the server verifies the information of the verification result to authenticate the user.

The FIDO authenticator 50 is an authenticator built in or externally attached to the terminal device 10 of the user U, and verifies the identity of the user U. For example, the FIDO authenticator 50 may be a biometric authentication function of a smartphone, or may be an external authenticator such as a universal serial bus (USB) key. Further, the FIDO authenticator 50 may be implemented inside the terminal device 10 of the user U in a format including software such as an app (application) or a browser or a specific hardware area. That is, the FIDO authenticator 50 may be the terminal device 10 of the user U. Furthermore, the FIDO authenticator 50 may be an authenticator physically different from the terminal device 10 capable of communicating with the terminal device 10 of the user U by wired communication or short-range wireless communication.

The authentication server 100 is an information processing device that functions as an authentication server having both a FIDO authentication function and a password authentication function, and is realized by a server device, a cloud system, or the like. That is, the authentication server 100 has both the FIDO authentication function and the password authentication function. For example, an authentication server of a company or the like that provides a wide variety of large-scale services may already support both the FIDO authentication function and the password authentication function.

For example, the authentication server 100 activates FIDO authentication through a UI screen of the existing password of the terminal device 10, and receives information of an authentication result from the terminal device 10. As a result, the authentication server 100 introduces the FIDO authentication function into the terminal device 10 without modifying an interface such as existing password authentication of the terminal device 10.

In the present embodiment, in a case where the authentication server 100 already has both the FIDO authentication function and the password authentication function, when a FIDO-compatible password manager is newly introduced into the terminal device 10, the FIDO authentication function is provided in which the interface based on the existing password is not modified while the consistency of the FIDO authentication is maintained between the authentication server 100 and the terminal device 10.

Further, the authentication server 100 may cooperate with the terminal device 10 of each user U and provide an application programming interface (API) service or the like for various applications or the like and various data to the terminal device 10 of each user U. At this time, the authentication server 100 may cooperate with the terminal device 10 of each user U and provide the terminal device 10 with a function as a FIDO-compatible password manager.

Furthermore, the authentication server 100 may be an information processing device that provides some kind of Web service online to the terminal device 10 of each user U. For example, the authentication server 100 may provide, as a Web service, service such as Internet connection, a search service, a social networking service (SNS), e-commerce, electronic payment, an online game, online banking, online trading, lodging and ticket reservation, moving image and music distribution, and the like. In practice, the authentication server 100 may mediate the Web service in cooperation with various servers that provide the Web service as described above, or may be in charge of processing the Web service.

Further, the authentication server 100 can acquire user information regarding the user U. For example, the authentication server 100 acquires information regarding attributes of the user U such as gender, age, and residential area of the user U. Then, the authentication server 100 stores and manages information regarding the attributes of the user U together with identification information (user ID or the like) indicating the user U.

Furthermore, the authentication server 100 acquires various history information (log data) indicating the behavior of the user U from the terminal device 10 of the user U or from various servers or the like on the basis of the user ID or the like. For example, the authentication server 100 acquires a location history, which is a history of a location and date and time of the user U, from the terminal device 10. In addition, the authentication server 100 acquires a search history, which is a history of a search query input by the user U, from a search server (search engine). In addition, the authentication server 100 acquires a browsing history, which is a history of content browsed by the user U, from a content server. In addition, the authentication server 100 acquires a purchase history (settlement history), which is a history of product purchase and settlement processing of the user U, from an e-commerce server or a settlement processing server. In addition, the authentication server 100 may acquire an exhibition history that is a history of exhibits of the user U on a marketplace or a sales history from an e-commerce server or a settlement server. Furthermore, the authentication server 100 acquires a post history, which is a history of posts of the user U, from a post server or an SNS server that provides a word-of-mouth posting service.

1-1. First Example

Here, a first example of an authentication method according to an embodiment will be described with reference to FIG. 1. The first example is a case of an original password interface, and a challenge is not sent from the authentication server 100 to the terminal device 10. It is assumed that the authentication server 100 trusts the terminal device 10. Further, it is assumed that the FIDO authenticator 50 is already registered. Furthermore, a key pair of a private key and a public key may be registered in advance in each of the terminal device 10 and the FIDO authenticator 50.

For example, as illustrated in FIG. 1, the terminal device 10 of the user U sets a password in the authentication server 100 in advance (Step S1). At this time, the terminal device 10 sends the password to the authentication server 100 by a password sending function 34A, and registers an ID (identifier) of the user U and the password in a memory area 40A inside the terminal device 10 in association with each other by a password management function 34B. The memory area 40A may be a secure area. The secure area is a memory area in which security is secured. The terminal device 10 registers a pair of the ID and the password of the user U for each authentication server. Further, the authentication server 100 registers the ID and the password of the user U in an authentication information database 123 inside the authentication server 100 in association with each other by a password management function 132A. Note that the ID of the user U may be a phone number, a mail address, or the like of the user U, or may be an arbitrary account (ID number or the like) issued by the authentication server 100. In addition, the terminal device 10 preferably sets, as the password, a password having such a number of characters (for example, the number of characters is 16 characters, 32 characters, or more.) that a general user cannot remember, in the authentication server 100.

Subsequently, the authentication server 100 makes an authentication request to the terminal device 10 of the user U, and sends server information (Step S2). At this time, the authentication server 100 provides the terminal device 10 with a user interface (UI) for authentication of the ID and the password. Note that the authentication server 100 may provide the UI for authentication of the ID and the password to the terminal device 10 in advance in a form of an application or the like. In this case, the authentication server 100 requests the terminal device 10 to display the UI for authentication of the ID and the password. Further, the authentication server 100 may provide a UI for authentication of the ID and the password by being automatically generated on a browser by a JavaScript (registered trademark) program that returns in response to access from the browser of the terminal device 10. The server information is information related to the authentication server 100 making the authentication request. Note that the server information may be included in the authentication request. For example, the server information may be included in the information of the UI for authentication of the ID and the password.

Subsequently, the terminal device 10 of the user U displays a password screen for inputting the ID and the password of the user U (Step S3). At this time, the terminal device 10 displays the UI for authentication of the ID and the password provided from the authentication server 100.

Although not illustrated, the terminal device 10 of the user U displays a FIDO button for executing FIDO authentication on a terminal side together with the password screen. When the user U desires the FIDO authentication on the terminal side, the user U presses the FIDO button. For example, the terminal device 10 determines whether the FIDO button has been pressed by the user U in a browser extension. When the FIDO button is not pressed by the user U or when a FIDO-compatible password manager is not implemented, the terminal device 10 normally receives an input of the ID and the password from the user U, and sends the ID and the password of the user U to the authentication server 100 by the password sending function 34A. Then, the authentication server 100 performs the conventional authentication. Conversely, in a case where the FIDO button is pressed by the user U, the terminal device 10 performs the following processing.

Subsequently, the terminal device 10 of the user U sends the challenge and the server information to the FIDO authenticator 50 by the password sending function 34A (Step S4). In the first example, the terminal device 10 generates a challenge to be sent to the FIDO authenticator 50. The challenge is a random character string that is valid only once, and is a data string that is determined based on a random number and is different every time.

Subsequently, the FIDO authenticator 50 performs user verification on the basis of biometric information acquired from the user U (Step S5). That is, the FIDO authenticator 50 verifies the identity of the user U in accordance with the FIDO regulations. For example, the FIDO authenticator 50 verifies the identity of the user U by collating the biometric information presented by the user U with the biometric information registered in advance in a secure area 50A inside the FIDO authenticator 50 and determining whether the biometric information matches as a result of the collation. At this time, the FIDO authenticator 50 determines that a verification target person is the user himself or herself if the biometric information matches as the result of the collation. On the other hand, the FIDO authenticator 50 determines that the verification target person is not the user himself or herself when the biometric information does not match as the result of the collation.

Note that the biometric information may be any one of, or a combination of, a fingerprint, a vein, a face, an iris, a voiceprint, and the like. In the present embodiment, fingerprint data is used as an example of the biometric information. Note that, in the present embodiment, the FIDO authenticator 50 confirms the identity by biometric authentication based on the biometric information, but actually, a means for confirming the identity is not limited to the biometric authentication. For example, the FIDO authenticator 50 may confirm the identity by authentication using a token that generates a one-time password.

Subsequently, in a case where the identity of the user U has been verified, the FIDO authenticator 50 registers or extracts a private key (Step S6). Note that, in a case where a key pair of a private key and a public key is registered in advance in the FIDO authenticator 50 and the terminal device 10, it is not necessary to register the private key.

For example, when the key pair of the private key and the public key is not registered in advance in the FIDO authenticator 50 and the terminal device 10, the FIDO authenticator 50 first generates a key pair of the private key and the public key for each authentication server based on the server information, and registers the private key in association with the server information. Here, the FIDO authenticator 50 generates the key pair corresponding to the authentication server 100. The private key is stored in the secure area 50A inside the FIDO authenticator 50 in association with the server information. At this time, the FIDO authenticator 50 may register the private key and the biometric information in association with each other in the secure area 50A inside the FIDO authenticator 50.

Further, in a case where the key pair has been registered (for example, second and subsequent times), the FIDO authenticator 50 extracts (detects) the registered private key. In the present embodiment, when the identity of the user U can be verified, the FIDO authenticator 50 searches for and accesses the private key registered in the secure area 50A inside the FIDO authenticator 50 on the basis of the server information. Note that, in a case where the FIDO authenticator 50 has not been able to extract the private key (in a case where the key pair has not been registered), the FIDO authenticator 50 may generate and register the key pair by the above procedure.

Subsequently, in a case where the identity of the user U can be verified, the FIDO authenticator 50 generates a signature (electronic signature) for the challenge using the above-described private key (Step S7). For example, FIDO authenticator 50 signs information including the challenge and the server information using the above-described private key. Furthermore, in the case of registration, the FIDO authenticator 50 signs the server information, authenticator information regarding the authenticator that has generated the signature, and certificate information (attestation) of the authenticator with a private key for attestation stored in advance.

Subsequently, the FIDO authenticator 50 sends a signature to the terminal device 10 of the user U (Step S8). Note that, in a case where the key pair of the private key and the public key is not registered in advance in the FIDO authenticator 50 and the terminal device 10, the FIDO authenticator 50 sends the public key only for the first time. At this time, the FIDO authenticator 50 returns the challenge with a signature to the terminal device 10 of the user U as a response together with the public key.

Subsequently, the terminal device 10 of the user U performs signature verification (including verification of the challenge) by a FIDO server function 340, and extracts the ID and the password of the user U from the memory area 40A by the password management function 34B (Step S9). Further, when the terminal device 10 receives the public key for the first time (when the public key is not registered), that is, from the FIDO authenticator 50, the password management function 34B registers the public key in the memory area 40A inside the terminal device 10. Then, the terminal device 10 extracts the public key registered in the memory area 40A for the second and subsequent times (after registration of the public key). At this time, the terminal device 10 performs signature verification using the public key corresponding to the private key by the FIDO server function 340, and determines that the authentication is successful only when the signature is an appropriate signature. For example, if the terminal device 10 can verify that the signature is proper using the public key, it can be cryptographically confirmed that the private key paired with the public key is certainly possessed by the FIDO authenticator 50, and thus, the terminal device 10 determines that the response from the FIDO authenticator 50 is reliable. Furthermore, when the terminal device 10 determines that the response from the FIDO authenticator 50 is reliable as a result of the signature verification (when verifying that the signature is proper), the password management function 34B extracts (reads) the ID and the password of the user U from the memory area 40A inside the terminal device 10, and automatically inputs the ID and the password to an input field on the password screen.

Subsequently, the terminal device 10 of the user U sends the ID, the password, and the verification result of the signature to the authentication server 100 by the password sending function 34A (Step S10). At this time, the terminal device 10 represents that the FIDO authentication is completed to the authentication server 100 by sending the password and the verification result of the signature. The authentication server 100 determines whether the FIDO authentication is performed on the terminal side according to the content of the information received from the terminal device 10.

Subsequently, the authentication server 100 verifies the ID and the password sent from the terminal device 10 of the user U by the password management function 132A (Step S11). That is, the authentication server 100 performs password authentication using the ID and the password of the user U.

1-2. Second Example

Figure 2:
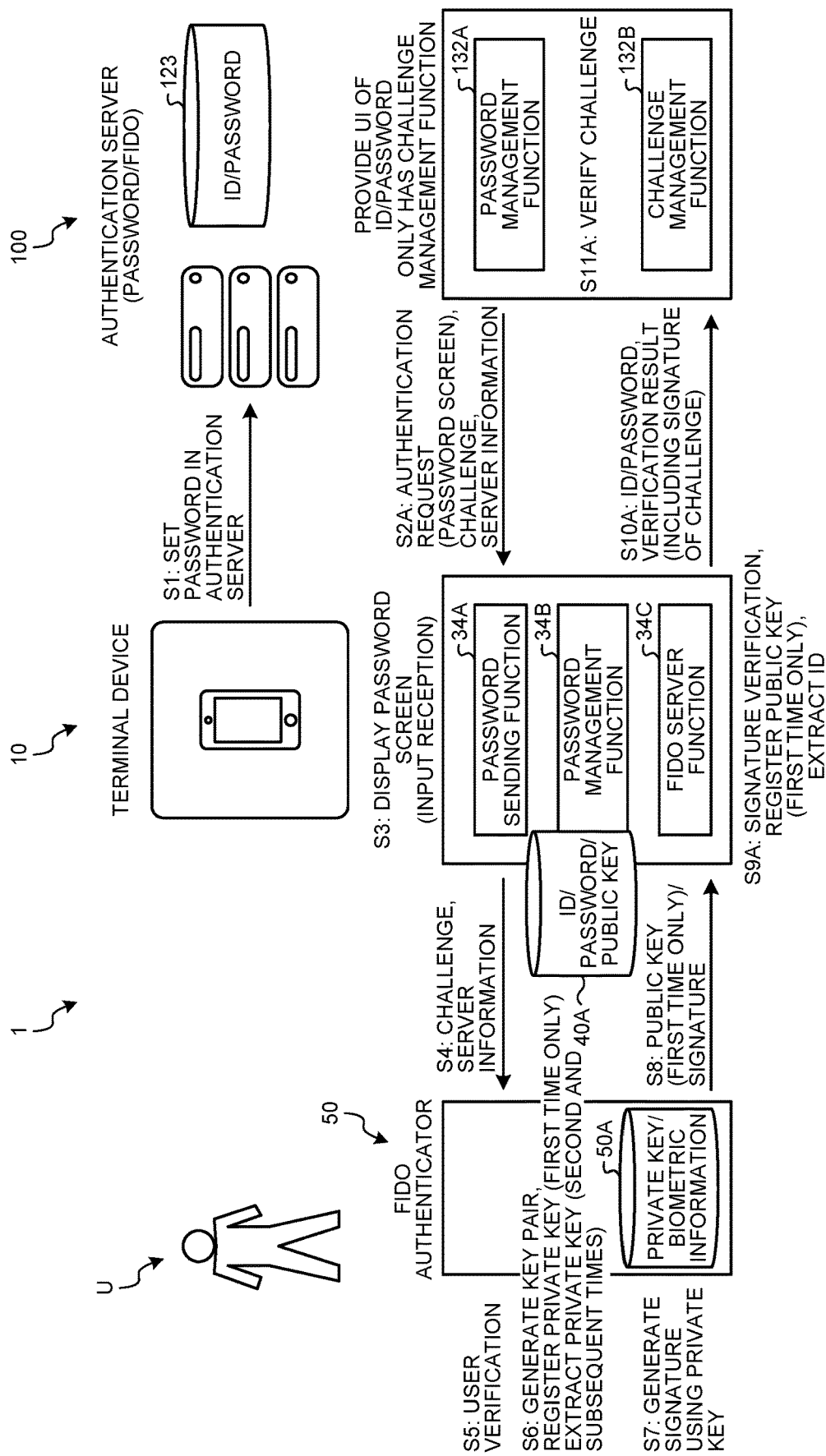
FIG. 2 is an explanatory diagram illustrating a second example of the authentication method according to the embodiment.

Next, a second example of the authentication method according to the embodiment will be described with reference to FIG. 2. FIG. 2 is an explanatory diagram illustrating the second example of the authentication method according to the embodiment. In the second example, a normal FIDO authentication result is returned, and a challenge is sent from the authentication server 100 to the terminal device 10. Note that, in the second example, Steps S1 and S3 to S8 described below are basically the same as those in the first example.

For example, as illustrated in FIG. 2, the terminal device 10 of the user U sets a password in the authentication server 100 in advance (Step S1). At this time, the terminal device 10 sends the password to the authentication server 100 by the password sending function 34A, and registers an ID of the user U and the password in the memory area 40A inside the terminal device 10 in association with each other by the password management function 34B. Further, the authentication server 100 registers the ID and the password of the user U in an authentication information database 123 inside the authentication server 100 in association with each other by a password management function 132A.

Subsequently, the authentication server 100 makes an authentication request to the terminal device 10 of the user U, and sends a challenge and server information (Step S2A). At this time, the authentication server 100 generates the challenge by a challenge management function 132B, and sends the challenge to the terminal device 10 together with the server information.

Subsequently, the terminal device 10 of the user U displays a password screen (Step S3). Subsequently, the terminal device 10 of the user U sends the challenge and the server information to the FIDO authenticator 50 by the password sending function 34A (Step S4). In the second example, the terminal device 10 transfers to the FIDO authenticator 50 the challenge and the server information sent from the authentication server 100.

Subsequently, the FIDO authenticator 50 performs user verification on the basis of biometric information acquired from the user U (Step S5). Subsequently, in a case where the identity of the user U has been verified, the FIDO authenticator 50 registers or extracts a private key (Step S6). For example, at the first time (when the private key is not registered), the FIDO authenticator 50 generates a key pair of a private key and a public key for each authentication server on the basis of the server information, and registers the private key in association with the server information. Then, in the second and subsequent times (after registration of the private key), the FIDO authenticator 50 searches for the registered private key on the basis of the server information, and extracts the corresponding private key. Subsequently, in a case where the identity of the user U can be verified, the FIDO authenticator 50 generates a signature for the challenge using the private key (Step S7). Subsequently, the FIDO authenticator 50 sends a response including the signature to the terminal device 10 of the user U (Step S8). At this time, the FIDO authenticator 50 returns the challenge with a signature to the terminal device 10 of the user U as a response. Note that the FIDO authenticator 50 also sends the public key for the first time (when the public key is not registered).

Subsequently, the terminal device 10 of the user U performs signature verification by the FIDO server function 34C, and extracts the ID and the password of the user U from the memory area 40A by the password management function 34B (Step S9A). Further, the terminal device 10 registers the public key in the memory area 40A inside the terminal device 10 by the password management function 34B for the first time (when the public key is not registered), and extracts the public key registered in the memory area 40A for the second and subsequent times (after the public key is registered). At this time, the terminal device 10 performs signature verification using the public key corresponding to the private key by the FIDO server function 34C, and determines that the authentication is successful only when the signature is an appropriate signature.

Subsequently, the terminal device 10 of the user U sends the ID, the password, and the verification result of the signature (including the signature of the challenge) to the authentication server 100 by the password sending function 34A (Step S10A). At this time, the authentication server 100 receives the verification result of the signature (including the signature of the challenge) from the terminal device 10, thereby determining that the FIDO authentication is performed on the terminal side.

Subsequently, the authentication server 100 verifies the challenge sent from the terminal device 10 of the user U by the challenge management function 132B (Step S11A). For example, the authentication server 100 collates the challenge generated by the challenge management function 132B and sent to the terminal device 10 with the challenge sent from the terminal device 10, and verifies whether they match.

1-3. Third Example

Figure 3:
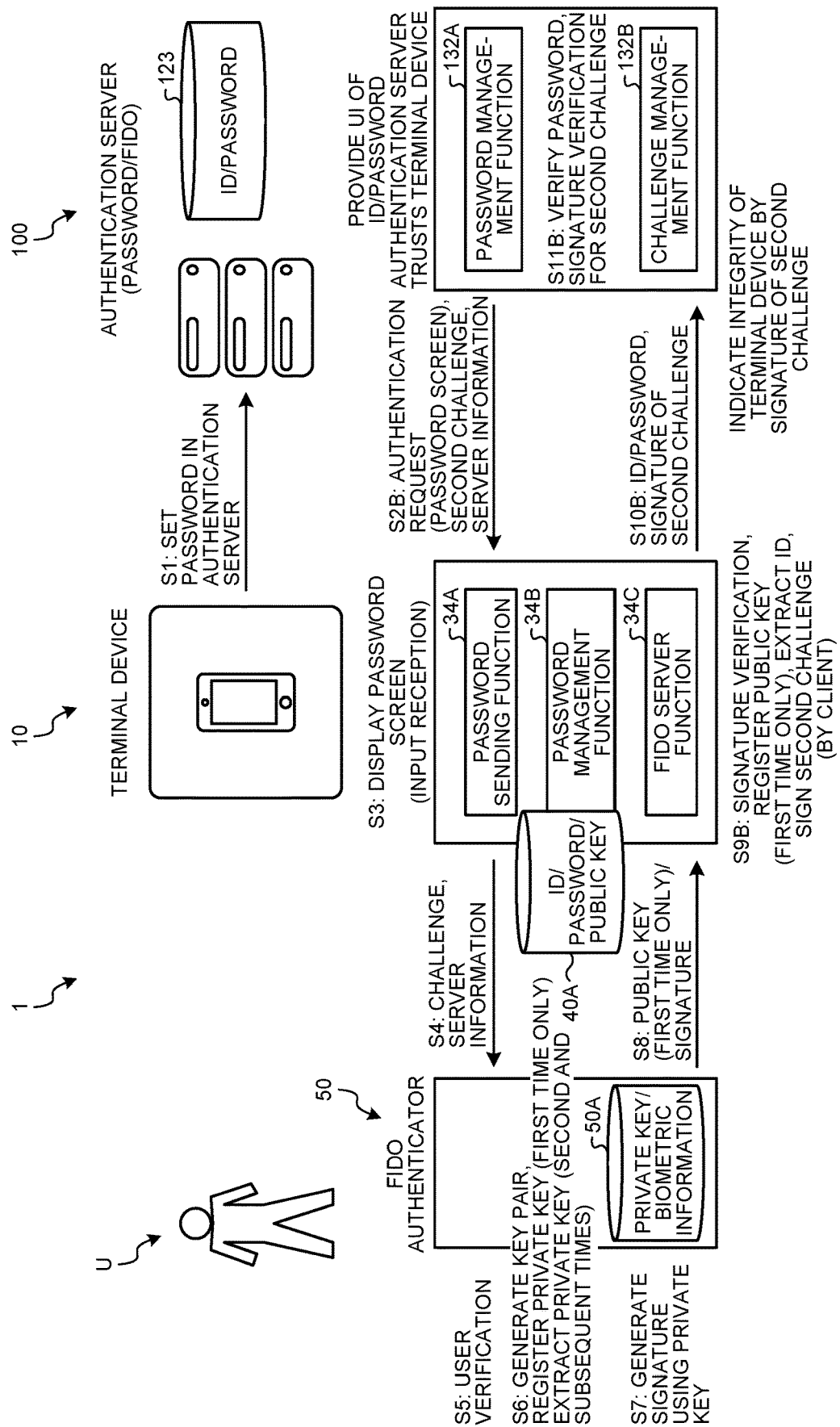
FIG. 3 is an explanatory diagram illustrating a third example of the authentication method according to the embodiment.

Next, a third example of the authentication method according to the embodiment will be described with reference to FIG. 3. FIG. 3 is an explanatory diagram illustrating the third example of the authentication method according to the embodiment. The third example is a case where a client signs a second challenge from the server separately from the challenge sent from the client to the authenticator, and the second challenge is sent from the authentication server 100 to the terminal device 10. That is, in the third example, there are two types of challenges. Note that, in the third example, Steps S1 and S3 to S8 described below are basically the same as those in the first example.

For example, as illustrated in FIG. 3, the terminal device 10 of the user U sets a password in the authentication server 100 in advance (Step S1). At this time, the terminal device 10 sends the password to the authentication server 100 by the password sending function 34A, and registers an ID of the user U and the password in the memory area 40A inside the terminal device 10 in association with each other by the password management function 34B. Further, the authentication server 100 registers the ID and the password of the user U in an authentication information database 123 inside the authentication server 100 in association with each other by a password management function 132A.

Subsequently, the authentication server 100 makes an authentication request to the terminal device 10 of the user U, and sends a second challenge and server information (Step S2B). At this time, the authentication server 100 provides the terminal device 10 with a UI for authentication of the ID and the password.

Subsequently, the terminal device 10 of the user U displays a password screen (Step S3). Subsequently, the terminal device 10 of the user U sends the challenge and the server information to the FIDO authenticator 50 by the password sending function 34A (Step S4). In the third example, the terminal device 10 generates a challenge to be sent to the FIDO authenticator 50. The challenge sent to the FIDO authenticator 50 and the second challenge sent from the authentication server 100 are different data from each other, and are not the same. Note that in practice, the challenge and the second challenge can be the same data. In this case, the same data is used properly as the challenge or the second challenge.

Subsequently, the FIDO authenticator 50 performs user verification on the basis of biometric information acquired from the user U (Step S5). Subsequently, in a case where the identity of the user U has been verified, the FIDO authenticator 50 registers or extracts a private key (Step S6). For example, for the first time (when the private key is not registered), a key pair of a private key and a public key is generated for each authentication server on the basis of the server information, and the private key is registered in association with the server information. In the second and subsequent times (after registration of the private key), the registered private key is searched on the basis of the server information, and the corresponding private key is extracted. Subsequently, in a case where the identity of the user U can be verified, the FIDO authenticator 50 generates a signature for the challenge using the private key (Step S7). Subsequently, the FIDO authenticator 50 sends a response including the signature to the terminal device 10 of the user U (Step S8). At this time, the FIDO authenticator 50 returns the challenge with a signature to the terminal device 10 of the user U as a response. Note that the FIDO authenticator 50 also sends the public key for the first time (when the public key is not registered).

Subsequently, the terminal device 10 of the user U performs signature verification by the FIDO server function 34C, and extracts the ID of the user U from the memory area 40A and signs the second challenge by the password management function 34B (Step S9B). Further, the terminal device 10 registers the public key in the memory area 40A inside the terminal device 10 by the password management function 34B for the first time (when the public key is not registered), and extracts the public key registered in the memory area 40A for the second and subsequent times (after the public key is registered). At this time, the terminal device 10 performs signature verification using the public key corresponding to the private key by the FIDO server function 34C, and determines that the authentication is successful only when the signature is an appropriate signature. Then, in a case where the authentication is successful, the terminal device 10 generates a signature for the second challenge using the private key. The private key is stored in the secure area inside the terminal device 10. Note that, in a case where the key pair of the private key and the public key used for the signature of the second challenge is not registered in advance in the terminal device 10 and the authentication server 100, the terminal device 10 generates the key pair of the private key and the public key only for the first time, and stores the private key in the secure area inside the terminal device 10.

Subsequently, the terminal device 10 of the user U sends the ID, the password, and the signature of the second challenge (signed second challenge) to the authentication server 100 by the password sending function 34A (Step S10B). Note that, in a case where the key pair of the private key and the public key used for the signature of the second challenge is not registered in advance in the terminal device 10 and the authentication server 100, only for the first time, the terminal device 10 sends the signature of the second challenge and the public key corresponding to the private key used for the signature to the authentication server 100. That is, the terminal device 10 of the user U returns the signed second challenge to the authentication server 100 as a response. At this time, the terminal device 10 of the user U may send the verification result of the signature generated by the FIDO authenticator 50 (signature of the challenge) to the authentication server 100 together with the ID and the password, and the signature of the second challenge by the password sending function 34A. Alternatively, the terminal device 10 may represent that the FIDO authentication is completed to the authentication server 100 by sending the signature of the second challenge. That is, the verification result of the signature (signature of the challenge) generated by the FIDO authenticator 50 may be sent by sending the signature of the second challenge.

Subsequently, the authentication server 100 verifies the ID and the password sent from the terminal device 10 of the user U and verifies the signature of the second challenge by the password management function 132A (Step S11B). That is, the authentication server 100 performs password authentication using the ID and the password of the user U. Further, the authentication server 100 verifies the signature of the second challenge using the public key corresponding to the private key, and determines that the authentication is successful only when the signature is appropriate. Furthermore, the authentication server 100 verifies the second challenge sent from the terminal device 10 of the user U by the challenge management function 132B.

Note that the first, second and third examples described above may be selectively implemented, or may be implemented in appropriate combination. For example, the authentication server 100 may apply the authentication method of the first or second example to the terminal device 10 that is trusted, and may apply the authentication method of the third example to the terminal device 10 that is not yet trusted. In this case, the authentication server 100 may apply the authentication method of the third example at the time of the first (initial) authentication, and may apply the authentication method of the first or second example at the time of the second or subsequent authentication. Alternatively, the authentication server 100 may use the authentication methods of the first, second and third examples together. That is, the authentication methods of the first, second and third examples may be performed simultaneously.

1-4. Features of Present Embodiment

The terminal device 10 according to the present application sends the challenge to the FIDO authenticator 50, receives the challenge with a signature and the public key from the FIDO authenticator 50, performs signature verification using the public key, and provides a verification result of the signature to the authentication server 100.

For example, when receiving an authentication request for the ID and password of the user U from the authentication server 100, the terminal device 10 sends a challenge to the FIDO authenticator 50, and when receiving the challenge with a signature and the public key from the FIDO authenticator 50, performs signature verification using the public key, and provides the authentication server 100 with a verification result of the signature together with the ID and password of the user U.

Further, when the verification request button displayed on the password screen for inputting the ID and the password of the user U is pressed, the terminal device 10 sends the challenge to the FIDO authenticator 50. Then, in a case where the verification request button is pressed, the terminal device 10 provides the verification result of the signature to the authentication server 100 together with the ID and the password of the user U. Conversely, in a case where the verification request button has not been pressed, only the ID and the password of the user U are provided to the authentication server 100.

Further, when receiving the challenge sent from the authentication server 100, the terminal device 10 sends (transfers) the challenge sent from the authentication server 100 to the FIDO authenticator 50. Then, when receiving the challenge with a signature and the public key from the FIDO authenticator 50, the terminal device 10 performs signature verification using the public key, and returns the challenge with a signature as a response to the authentication server 100 together with the verification result of the signature.

Furthermore, the terminal device 10 receives the second challenge sent from the authentication server 100, and sends a challenge different from the second challenge to the FIDO authenticator 50. Next, when receiving the challenge with a signature and the public key from the FIDO authenticator 50, the terminal device 10 performs signature verification using the public key. In a case where the authentication is successful as a result of performing the signature verification, the terminal device 10 generates a signature of the second challenge. Then, the terminal device 10 returns the signature of the second challenge to the authentication server 100 as a response. Note that the terminal device 10 indicates the integrity of the terminal device 10 by the signature of the second challenge.

Here, the terminal device 10 provides the verification result of the signature to the authentication server 100 having both the FIDO authentication function and the password authentication function. In addition, the terminal device 10 represents that the FIDO authentication is completed by providing the verification result of the signature.

Further, the authentication server 100 according to the present application makes an authentication request to the terminal device 10, and when receiving the verification result of the signature generated by the FIDO authenticator 50 together with the ID and the password of the user U from the terminal device 10, the authentication server 100 determines that the FIDO authentication is completed with the verification result of the signature, and verifies the ID and the password of the user U. Note that the authentication server 100 has both the FIDO authentication function and the password authentication function.

In addition, the authentication server 100 sends the challenge to the terminal device 10. Next, the authentication server 100 receives the challenge for which the signature is generated by the FIDO authenticator 50 as a response together with the verification result of the signature from the terminal device 10. Then, the authentication server 100 verifies the challenge sent as a response from the terminal device 10.

Further, the authentication server 100 sends the second challenge to the terminal device 10. Next, the authentication server 100 receives, as a response, a signature of the second challenge generated by the terminal device 10 from the terminal device 10 that has performed the FIDO authentication. Then, the authentication server 100 verifies the signature of the second challenge sent as a response from the terminal device 10.

As described above, in the present embodiment, in a case where the server side includes both the password authentication function and the FIDO authentication function, when the terminal device receives an authentication request or a challenge from the server side, it is determined whether the terminal device has the FIDO function, and in a case where the terminal device has the FIDO function, the terminal device performs the FIDO authentication. The terminal device installs an application of a password manager having such a function. Further, on the password screen, there is a FIDO button for inquiring whether to perform the FIDO authentication. The terminal device determines pressing of the FIDO button in the browser extension function, and performs FIDO authentication when the FIDO button is pressed. The server side determines whether the FIDO authentication is performed according to the content of the information received from the terminal device. For example, when the terminal device transmits the FIDO authentication result or the challenge result, the server side does not perform the FIDO authentication.

2. Configuration Example of Authentication System

Figure 4:
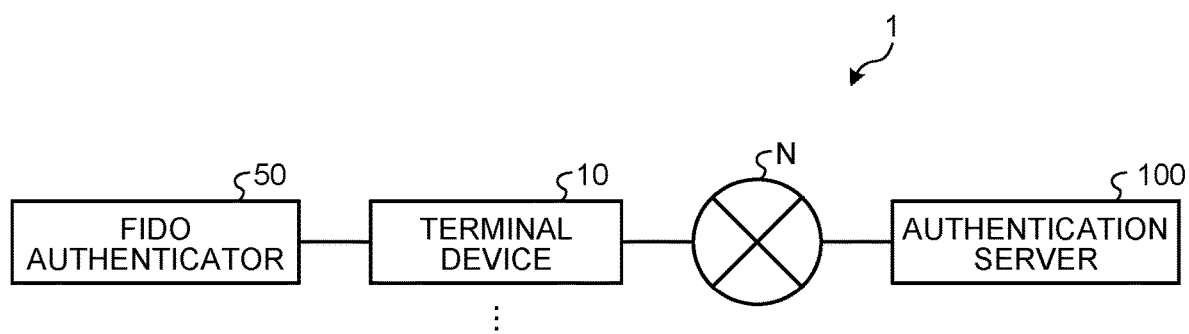
FIG. 4 is a diagram illustrating a configuration example of an authentication system according to an embodiment.

Next, a configuration of the authentication system 1 including the authentication server 100 according to the embodiment will be described with reference to FIG. 4. FIG. 4 is a diagram illustrating a configuration example of the authentication system 1 according to the embodiment. As illustrated in FIG. 4, the authentication system 1 according to the embodiment includes the terminal device 10, the FIDO authenticator 50, and the authentication server 100. The terminal device 10 and the authentication server 100 are communicably connected via a network N in a wired or wireless manner. The network N is, for example, a local area network (LAN) or a wide area network (WAN) such as the Internet.

Further, the number of devices included in the authentication system 1 illustrated in FIG. 4 is not limited to the illustrated number. For example, in FIG. 4, for simplification of illustration, only one terminal device 10 and one authentication server 100 are illustrated, but this is merely an example and is not limited thereto, and two or more terminal devices 10 and two or more authentication servers 100 may be provided.

The terminal device 10 is an information processing device used by the user U. For example, the terminal device 10 is a smart device such as a smartphone or a tablet terminal, a personal computer (PC), a feature phone, a personal digital assistant (PDA), a game machine having a communication function, a car navigation system, a wearable device such as a smart watch or a head mounted display, smart glasses, or the like.

Further, the terminal device 10 can connect to the network N via a wireless communication network such as long term evolution (LTE), fourth generation (4G), or fifth generation (5G) mobile communication system, or short-range wireless communication such as Bluetooth (registered trademark) or a wireless local area network (LAN), and communicate with the authentication server 100.

The authentication server 100 is, for example, a PC, a server device, a mainframe, a workstation, or the like. Note that the authentication server 100 may be realized by cloud computing.

3. Configuration Example of Terminal Device

Figure 5:
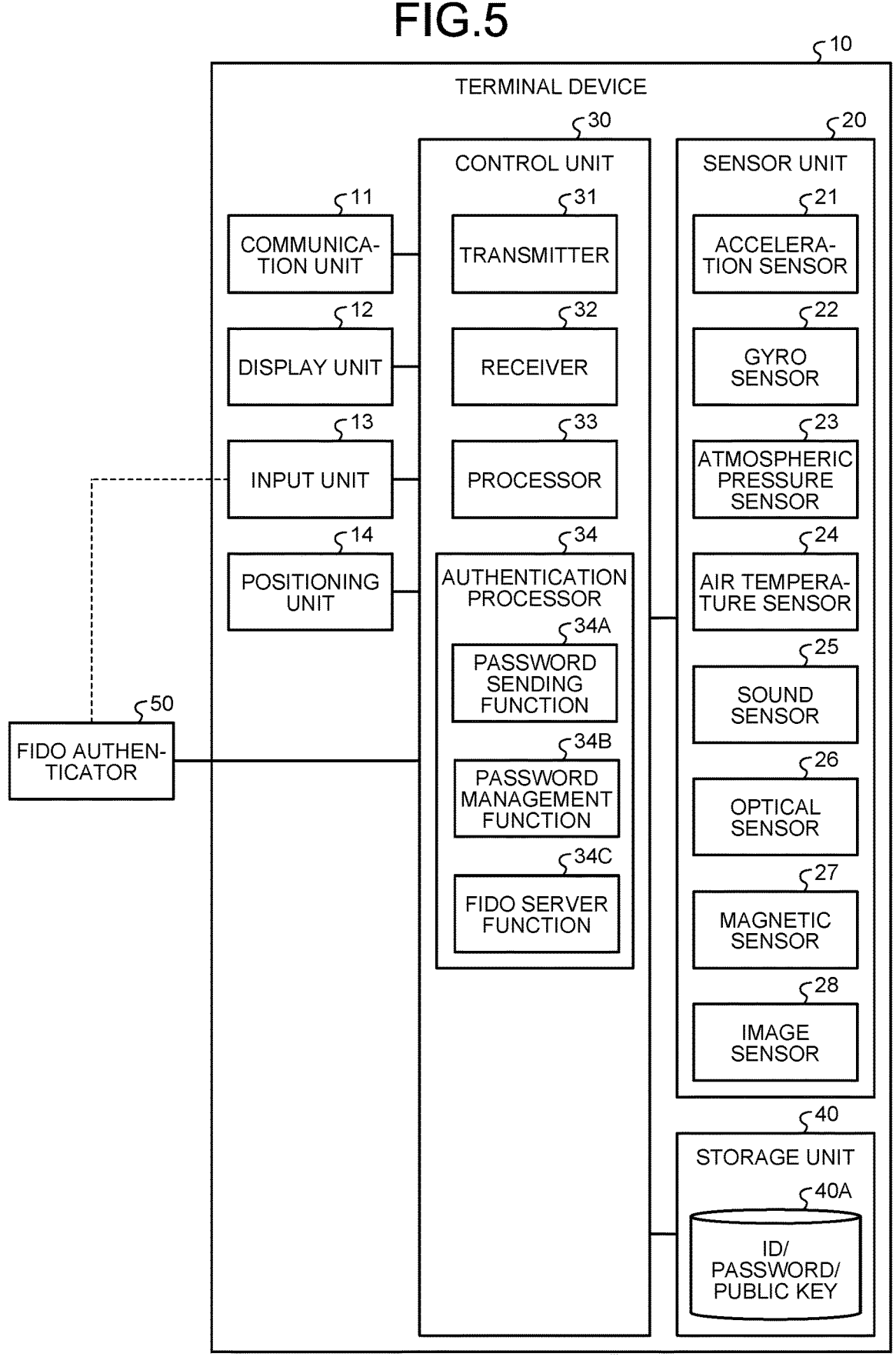
FIG. 5 is a diagram illustrating a configuration example of a terminal device according to an embodiment.

Next, a configuration of the terminal device 10 will be described with reference to FIG. 5. FIG. 5 is a diagram illustrating a configuration example of the terminal device 10. As illustrated in FIG. 5, the terminal device 10 includes a communication unit 11, a display unit 12, an input unit 13, a positioning unit 14, a sensor unit 20, a control unit 30 (controller), and a storage unit 40.

Communication Unit 11

The communication unit 11 is connected to the network N (see FIG. 4) in a wired or wireless manner, and transmits and receives information to and from the authentication server 100 via the network N. For example, the communication unit 11 is realized by a network interface card (NIC), an antenna, or the like.

Display Unit 12

The display unit 12 is a display device that displays various types of information such as position information. For example, the display unit 12 is a liquid crystal display (LCD) or an organic electro-luminescent display (organic EL display). Further, the display unit 12 is a touch panel type display, but is not limited thereto.

Input Unit 13

The input unit 13 is an input device that receives various operations from the user U. For example, the input unit 13 includes a button or the like for inputting characters, numbers, and the like. Note that the input unit 13 may be an input/output port (I/O port), a universal serial bus (USB) port, or the like. Further, in a case where the display unit 12 is a touch panel type display, a part of the display unit 12 functions as the input unit 13. Furthermore, the input unit 13 may be a microphone or the like that receives voice input from the user U. The microphone may be wireless.

Positioning Unit 14

The positioning unit 14 receives a signal (radio wave) sent from a satellite of a global positioning system (GPS), and acquires position information (for example, latitude and longitude) indicating the current position of the terminal device 10 which is the own device on the basis of the received signal. That is, the positioning unit 14 measures the position of the terminal device 10. Note that the GPS is merely an example of a global navigation satellite system (GNSS).

Further, the positioning unit 14 can measure the position by various methods other than the GPS. For example, as auxiliary positioning unit for position correction and the like, the positioning unit 14 may measure the position using various communication functions of the terminal device 10 as follows.

Wi-Fi Positioning

For example, the positioning unit 14 measures the position of the terminal device 10 using a Wi-Fi (registered trademark) communication function of the terminal device 10 or a communication network provided in each communication company. Specifically, the positioning unit 14 measures the position of the terminal device 10 by performing Wi-Fi communication or the like and measuring the distance to a nearby base station or access point.

Beacon Positioning

Further, the positioning unit 14 may measure the position using the Bluetooth (registered trademark) function of the terminal device 10. For example, the positioning unit 14 measures the position of the terminal device 10 by connecting to a beacon transmitter connected by a Bluetooth (registered trademark) function.

Geomagnetic Positioning

Furthermore, the positioning unit 14 measures the position of the terminal device 10 on the basis of a geomagnetic pattern of a structure measured in advance and a geomagnetic sensor included in the terminal device 10.

RFID Positioning

Further, for example, in a case where the terminal device 10 has a function of a radio frequency identification (RFID) tag equivalent to a contactless IC card used at a station ticket gate, a store, or the like, or has a function of reading the RFID tag, a used position is recorded together with information on payment or the like made by the terminal device 10. The positioning unit 14 may measure the position of the terminal device 10 by acquiring such information. Furthermore, the position may be measured by an optical sensor, an infrared sensor, or the like included in the terminal device 10.

The positioning unit 14 may measure the position of the terminal device 10 using one or a combination of the above-described positioning units as necessary.

Sensor Unit 20

The sensor unit 20 includes various sensors mounted on or connected to the terminal device 10. Note that the connection may be a wired connection or a wireless connection. For example, the sensors may be a detection device other than the terminal device 10, such as a wearable device or a wireless device. In the example illustrated in FIG. 5, the sensor unit 20 includes an acceleration sensor 21, a gyro sensor 22, an atmospheric pressure sensor 23, an air temperature sensor 24, a sound sensor 25, an optical sensor 26, a magnetic sensor 27, and an image sensor (camera) 28.

Note that each of the sensors 21 to 28 described above is merely an example and is not limited. That is, the sensor unit 20 may be configured to include a part of each of the sensors 21 to 28, or may include other sensors such as a humidity sensor in addition to or instead of each of the sensors 21 to 28.

The acceleration sensor 21 is, for example, a three-axis acceleration sensor, and detects physical movement of the terminal device 10 such as a moving direction, speed, and acceleration of the terminal device 10. The gyro sensor 22 detects physical movement of the terminal device 10 such as inclination in three axis directions on the basis of angular velocity or the like of the terminal device 10. The atmospheric pressure sensor 23 detects, for example, an atmospheric pressure around the terminal device 10.

Since the terminal device 10 includes the acceleration sensor 21, the gyro sensor 22, the atmospheric pressure sensor 23, and the like described above, the position of the terminal device 10 can be measured using a technique such as pedestrian dead reckoning (PDR) using each of these sensors 21 to 23 and the like. This makes it possible to acquire indoor position information that is difficult to acquire by a positioning system such as a GPS.

For example, the number of steps, walking speed, and walking distance can be calculated by a pedometer using the acceleration sensor 21. In addition, it is possible to know the traveling direction, the direction of the line of sight, and the inclination of the body of the user U using the gyro sensor 22. In addition, the altitude at which the terminal device 10 of the user U exists and the floor number can be known from the air pressure detected by the atmospheric pressure sensor 23.

The air temperature sensor 24 detects, for example, an air temperature around the terminal device 10. The sound sensor 25 detects, for example, a sound around the terminal device 10. The optical sensor 26 detects illuminance around the terminal device 10. The magnetic sensor 27 detects, for example, geomagnetism around the terminal device 10. The image sensor 28 captures an image around the terminal device 10.

The atmospheric pressure sensor 23, the air temperature sensor 24, the sound sensor 25, the optical sensor 26, and the image sensor 28 described above can detect the atmospheric pressure, the air temperature, the sound, and the illuminance, respectively, and can detect the environment, the situation, and the like around the terminal device 10 by capturing an image of the surroundings. Furthermore, the accuracy of the position information of the terminal device 10 can be improved from the environment, situation, and the like around the terminal device 10.

Control Unit 30

The control unit 30 includes, for example, a microcomputer including a central processing unit (CPU), a read only memory (ROM), a RAM, an input/output port, and the like, and various circuits. Further, the control unit 30 may include, for example, hardware such as an integrated circuit such as an application specific integrated circuit (ASIC) or a field programmable gate array (FPGA). The control unit 30 includes a transmitter 31, a receiver 32, a processor 33, and an authentication processor 34.

Transmitter 31

The transmitter 31 can transmit, for example, various types of information input by the user U using the input unit 13, various types of information detected by each of the sensors 21 to 28 mounted on or connected to the terminal device 10, position information of the terminal device 10 measured by the positioning unit 14, and the like to the authentication server 100 via the communication unit 11.

Receiver 32

The receiver 32 can receive various types of information provided from the authentication server 100 and requests for various types of information from the authentication server 100 via the communication unit 11.

Processor 33

The processor 33 controls the entire terminal device 10 including the display unit 12 and the like. For example, the processor 33 can output various types of information transmitted by the transmitter 31 and various types of information from the authentication server 100 received by the receiver 32 to the display unit 12 to display.

Authentication Processor 34

The authentication processor 34 is realized by a FIDO compatible password manager, and performs FIDO authentication with the FIDO authenticator 50. Note that the authentication processor 34 may be realized by the processor 33 described above. The authentication processor 34 has the password sending function 34A, the password management function 34B, and the FIDO server function 34C.

Password Sending Function 34A

The password sending function 34A sends the ID and password of the user U to the authentication server 100. In addition, the password sending function 34A receives authentication information and a challenge together with server information from the authentication server 100. In addition, the password sending function 34A sends the challenge and the server information to the FIDO authenticator 50. Further, the password sending function 34A transmits the ID, the password, and the verification result of the signature transmitted from the FIDO authenticator 50 to the authentication server 100. At this time, the password sending function 34A may sign the second challenge transmitted from the authentication server 100 instead of/together with the verification result of the signature sent from the FIDO authenticator 50, and send the signature of the second challenge to the authentication server 100. Note that password sending function 34A may be implemented by the transmitter 31 and the receiver 32 described above.

Password Management Function 34B

The password management function 34B associates an identifier (ID) of the user U with a password, registers the ID and the password in the memory area 40A inside the terminal device 10, and manages the ID and the password. Further, the password management function 34B extracts the ID and password of the user U from the memory area 40A inside the terminal device 10. Furthermore, the password management function 34B registers and manages the public key sent from the FIDO authenticator 50 in the memory area 40A inside the terminal device 10 in association with the ID and the password of the user U.

FIDO Server Function 34C

The FIDO server function 34C receives the signature generated by the private key and the public key corresponding to the private key from the FIDO authenticator 50, and performs signature verification using the public key sent from the FIDO authenticator 50. For example, the FIDO server function 34C receives the challenge with a signature and the public key from the FIDO authenticator 50 and performs signature verification using the public key.

As described above, the control unit 30 includes a sending unit that sends the challenge to the FIDO authenticator 50, a reception unit that receives the challenge with a signature and the public key from the FIDO authenticator 50, a verification unit that performs signature verification using the public key, and a providing unit that provides a verification result of the signature to the authentication server. At this time, the transmitter 31, the receiver 32, the processor 33, and the authentication processor 34 function as the sending unit, the reception unit, the verification unit, and the providing unit.

Further, the reception unit receives an authentication request for the ID and password of the user U from the authentication server 100. Then, the providing unit provides the authentication server 100 with the verification result of the signature together with the ID and the password of the user U.

When the verification request button displayed on the password screen for inputting the ID and the password of the user U is pressed, the sending unit sends the challenge to the FIDO authenticator 50. Then, in a case where the verification request button is pressed, the providing unit provides the verification result of the signature to the authentication server 100 together with the ID and the password of the user U, and in a case where the verification request button is not pressed, the providing unit provides only the ID and the password of the user U to the authentication server 100.

Furthermore, the reception unit receives the challenge sent from the authentication server 100. Next, the sending unit sends the challenge sent from the authentication server 100 to the FIDO authenticator 50. Then, the providing unit returns the challenge with a signature to the authentication server 100 as a response together with the verification result of the signature.

In addition, the reception unit receives the second challenge sent from the authentication server 100. Next, the sending unit sends a challenge different from the second challenge to the FIDO authenticator 50. Next, the reception unit receives the challenge with a signature and the public key from the FIDO authenticator 50. Next, in a case where the authentication is successful as a result of performing the signature verification using the public key, the verification unit generates a signature of the second challenge. Then, the providing unit returns the signature of the second challenge to the authentication server 100 as a response. Note that the providing unit indicates the integrity of the terminal device 10 by the signature of the second challenge.

Further, the providing unit provides the verification result of the signature to the authentication server 100 having both the FIDO authentication function and the password authentication function. Furthermore, the providing unit represents that the FIDO authentication is completed by providing the verification result of the signature.

Storage Unit 40

The storage unit 40 is realized by, for example, a semiconductor memory element such as a random access memory (RAM) or a flash memory, or a storage device such as a hard disk drive (HDD), a solid state drive (SSD), or an optical disc. The storage unit 40 stores various programs, various data, and the like. In the present embodiment, the ID, the password, and the public key of the user U are stored in the memory area 40A inside the terminal device 10 in the storage unit 40.

4. Configuration Example of Authentication Server

Figure 6:
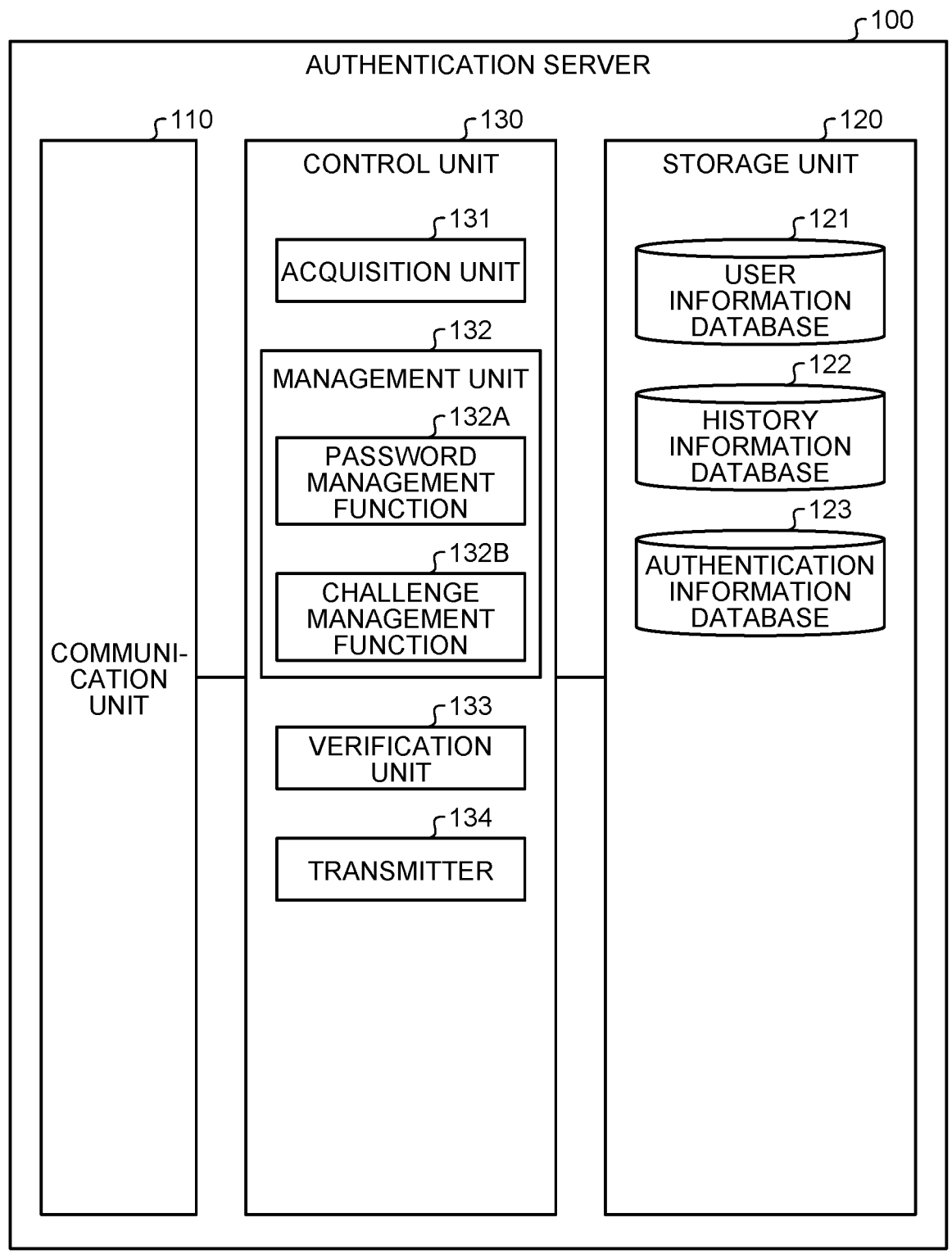
FIG. 6 is a diagram illustrating a configuration example of an authentication server according to an embodiment.

Next, a configuration of the authentication server 100 according to the embodiment will be described with reference to FIG. 6. FIG. 6 is a diagram illustrating a configuration example of the authentication server 100 according to the embodiment. As illustrated in FIG. 6, the authentication server 100 includes a communication unit 110, a storage unit 120, and a control unit 130.

Communication Unit 110

The communication unit 110 is realized by, for example, a network interface card (NIC) or the like. Furthermore, the communication unit 110 is connected to the network N (see FIG. 4) in a wired or wireless manner.

Storage Unit 120

The storage unit 120 is realized by, for example, a semiconductor memory element such as a random access memory (RAN) or a flash memory, or a storage device such as a hard disk or an optical disk. As illustrated in FIG. 6, the storage unit 120 includes a user information database 121, a history information database 122, and an authentication information database 123.

User Information Database 121

The user information database 121 stores user information on the user U. For example, the user information database 121 stores various types of information such as attributes of the user U. FIG. 7 is a diagram illustrating an example of the user information database 121. In the example illustrated in FIG. 7, the user information database 121 includes items such as "user identifier (ID)", "age", "gender", "home", "work place", and "interest".

The "user ID" indicates identification information for identifying the user U. Note that the "user ID" may be a contact address (telephone number, mail address, etc.) of the user U or identification information for identifying the terminal device 10 of the user U.

The "age" indicates the age of the user U identified by the user ID. Note that the "age" may be information indicating a specific age (for example, 35 years old) of the user U, or may be information indicating an age (for example, thirties) of the user U. Alternatively, the "age" may be information indicating the date of birth of the user U, or may be information indicating the generation of the user U (for example, born in the '80s). Further, the "gender" indicates the gender of the user U identified by the user ID.

Furthermore, "home" indicates position information of the home of the user U identified by the user ID. Note that, in the example illustrated in FIG. 7, the "home" illustrates an abstract code such as "LC11", but may be latitude and longitude information or the like. In addition, for example, "home" may be an area name or an address.

Further, the "work place" indicates position information of the work place (school in the case of a student) of the user U identified by the user ID. Note that, in the example illustrated in FIG. 7, the "work place" is an abstract code such as "LC12", but may be latitude and longitude information or the like. Furthermore, for example, the "work place" may be an area name or an address.

Furthermore, "interest" indicates an interest of the user U identified by the user ID. That is, the "interest" indicates a target of high interest of the user U identified by the user ID. For example, the "interest" may be a search query (keyword) or the like searched by the user U inputting to the search engine. Note that, in the example illustrated in FIG. 7, one "interest" is illustrated for each user U, but a plurality of "interests" may be illustrated.

For example, in the example illustrated in FIG. 7, the age of the user U identified by the user ID "U1" is "twenties", and the gender is "male". Furthermore, for example, the user U identified by the user ID "U1" indicates that the home is "LC11". Furthermore, for example, the user U identified by the user ID "U1" indicates that the work place is "LC12". Furthermore, for example, the user U identified by the user ID "U1" indicates that the user U is interested in "sports".

Here, in the example illustrated in FIG. 7, it is illustrated using abstract values such as "U1", "LC11", and "LC12", but it is assumed that information such as specific character strings and numerical values is stored in "U1", "LC11", and "LC12". Hereinafter, an abstract value may be illustrated in a diagram related to other information.

Note that the user information database 121 is not limited to the above, and may store various types of information depending on the purpose. For example, the user information database 121 may store various types of information regarding the terminal device 10 of the user U. In addition, the user information database 121 may store information regarding attributes of the user U, such as demographic attribute, psychographic attribute, geographic attribute, and behavioral attribute. For example, the user information database 121 may store information such as a name, a family structure, a hometown (local area), an occupation, a position, an income, a qualification, a residential form (detached house, apartment, etc.), presence or absence of a car, commuting time to school/work, a commuting route to school/work, a commuter pass section (station, route, etc.), a frequently used station (other than the nearest station of the home/workplace), a lesson (place, time zone, etc.), a hobby, an interest, a lifestyle, and the like.

History Information Database 122

The history information database 122 stores various types of information related to history information (log data) indicating the behavior of the user U. FIG. 8 is a diagram illustrating an example of the history information database 122. In the example illustrated in FIG. 8, the history information database 122 includes items such as "user ID", "position history", "search history", "browsing history", "purchase history", and "post history".

The "user ID" indicates identification information for identifying the user U. The "position history" indicates a position history which is a history of the position and movement of the user U. In addition, the "search history" indicates a search history which is a history of a search query input by the user U. In addition, the "browsing history" indicates a browsing history which is a history of content browsed by the user U. The "purchase history" indicates a purchase history which is a purchase history of the user U. Furthermore, the "post history" indicates a post history which is a history of posts by the user U. Note that the "post history" may include a question regarding the belongings of the user U.

For example, in the example illustrated in FIG. 8, the user U identified by the user ID "U1" moves according to "position history #1", searches according to "search history #1", browses content according to "browsing history #1", purchases a predetermined product or the like at a predetermined store or the like according to "purchase history #1", and posts according to "post history".

Here, in the example illustrated in FIG. 8, it is illustrated using abstract values such as "U1", "position history #1", "search history #1", "browsing history #1", "purchase history #1", and "post history #1", but it is assumed that information such as a specific character string or numerical value is stored in "U1", "position history #1", "search history #1", "browsing history #1", "purchase history #1", and "post history #1".

Note that the history information database 122 is not limited to the above, and may store various types of information depending on the purpose. For example, the history information database 122 may store a use history or the like of a predetermined service of the user U. In addition, the history information database 122 may store a visit history of a real store of the user U, a visit history of a facility, or the like. Furthermore, the history information database 122 may store a settlement history or the like of settlement (electronic settlement) using the terminal device 10 of the user U.

Authentication Information Database 123

The authentication information database 123 stores various types of information regarding authentication information of the user U. FIG. 9 is a diagram illustrating an example of the authentication information database 123. In the example illustrated in FIG. 9, the authentication information database 123 includes items such as "user ID" and "password".

The "user ID" indicates identification information for identifying the user U. The "password" indicates a password used for authentication of the user U. The password is associated with the user ID. That is, the authentication information database 123 stores a set of the user ID and the password.

For example, in the example illustrated in FIG. 9, "password #1" is associated with the user ID "U1". The user U identified by the user ID "U1" indicates that the password authentication succeeds when the password authentication is performed using "password #1".

Here, in the example illustrated in FIG. 8, an abstract value such as "U1" and "password #1" is used for illustration, but information such as a specific character string or numerical value is stored in "U1" and "password #1".

Note that the authentication information database 123 is not limited to the above, and may store various types of information depending on the purpose. For example, the authentication information database 123 may store a public key in a key pair of a private key and a public key generated by the terminal device 10 of the user U. At this time, the authentication information database 123 may store the public key transmitted from the terminal device 10 of the user U in association with the user ID and the password. Furthermore, the authentication information database 123 may store information regarding the authentication request, the challenge, and/or the second challenge transmitted to the terminal device 10 of the user U. At this time, the authentication information database 123 may store information related to a UI for authentication of an ID and a password.

Control Unit 130

Returning to FIG. 6, the description will be continued. The control unit 130 is a controller, and is implemented by, for example, a central processing unit (CPU), a micro processing unit (MPU), an application specific integrated circuit (ASIC), a field programmable gate array (FPGA), or the like executing various programs (corresponding to an example of an authentication program) stored in a storage device inside the authentication server 100 using a storage area such as a RAM as a work area. In the example illustrated in FIG. 6, the control unit 130 includes an acquisition unit 131, a management unit 132, a verification unit 133, and a transmitter 134.

Acquisition Unit 131

The acquisition unit 131 acquires the ID and the password of the user U from the terminal device 10 of the user U via the communication unit 110. For example, the acquisition unit 131 acquires the ID and password of the user U from the terminal device 10 of the user U via the communication unit 110 at the time of user registration or user authentication of the user U.

In addition, the acquisition unit 131 acquires the verification result of the signature from the terminal device 10 of the user U via the communication unit 110. Note that the verification result of the signature may include the signature of the challenge transmitted from the authentication server 100 to the terminal device 10.

In addition, the acquisition unit 131 acquires user information regarding the user U via the communication unit 110. For example, the acquisition unit 131 acquires identification information (user ID or the like) indicating the user U, position information of the user U, attribute information of the user U, and the like from the terminal device 10 of the user U. In addition, the acquisition unit 131 may acquire identification information indicating the user U, attribute information of the user U, and the like at the time of registering the user U. Then, the acquisition unit 131 registers the user information in the user information database 121 of the storage unit 120.

Further, the acquisition unit 131 acquires various types of history information (log data) indicating the behavior of the user U via the communication unit 110. For example, the acquisition unit 131 acquires various types of history information indicating the behavior of the user U from the terminal device 10 of the user U or from various servers or the like on the basis of the user ID or the like. Then, the acquisition unit 131 registers various types of history information in the history information database 122 of the storage unit 120.

Management Unit 132

The management unit 132 manages authentication information of the user U. The management unit 132 has a password management function 132A and a challenge management function 132B.

Password Management Function 132A

The password management function 132A manages the ID and the password of each user U in association with each other. For example, the password management function 132A registers a set of an ID and a password of each user U in the authentication information database 123 of the storage unit 120. The password management function 132A collates the ID and the password transmitted from the terminal device 10 of the user U with the ID and the password registered in the authentication information database 123.

Challenge Management Function 132B

The challenge management function 132B generates and manages a challenge. Further, the challenge management function 132B verifies the challenge sent (returned) from the terminal device 10 of the user U. For example, the challenge management function 132B collates the challenge transmitted to the terminal device 10 of the user U with the challenge transmitted (returned) from the terminal device 10 of the user U.

Verification Unit 133

The verification unit 133 generates and manages the second challenge. Furthermore, the verification unit 133 verifies the signature of the second challenge. For example, when receiving the second challenge (signed second challenge) signed by the terminal device 10 side of the user U using the private key and the public key corresponding to the private key from the terminal device 10, the verification unit 133 performs signature verification using the public key. In addition, the verification unit 133 has a function of performing FIDO authentication (FIDO server function). Note that the verification unit 133 may cooperate with or be integrated with the management unit 132 described above. That is, the verification unit 133 may have both the FIDO authentication function and the password authentication function.

Transmitter 134

The transmitter 134 transmits an authentication request (password screen) to the terminal device 10 of the user U via the communication unit 110. For example, the transmitter 134 provides a UI for authentication of an ID and a password to the terminal device 10 of the user U via the communication unit 110.

Furthermore, the transmitter 134 transmits the challenge and the second challenge to the terminal device 10 of the user U via the communication unit 110. The transmitter 134 transmits the server information to the terminal device 10 of the user U via the communication unit 110.

As described above, the control unit 130 includes a sending unit that sends an authentication request to the terminal device 10, an acquisition unit that receives, from the terminal device 10, a verification result of the signature generated by the FIDO authenticator 50 together with the ID and the password of the user U, and a verification unit that determines that the FIDO authentication is completed with the verification result of the signature and verifies the ID and the password of the user U. At this time, the acquisition unit 131, the management unit 132, the verification unit 133, and the transmitter 134 function as a sending unit, an acquisition unit, and a verification unit.

Further, the sending unit sends the challenge to the terminal device 10. Next, the acquisition unit receives, from the terminal device 10, the challenge for which the signature is generated by the FIDO authenticator 50 as a response together with the verification result of the signature. Then, the verification unit verifies the challenge sent as a response from the terminal device 10.

Furthermore, the sending unit sends the second challenge to the terminal device 10. Next, the acquisition unit receives a signature of the second challenge generated by the terminal device 10 as a response from the terminal device 10 that has performed the FIDO authentication. Then, the verification unit verifies the signature of the second challenge sent as a response from the terminal device 10. Note that the verification unit has both the FIDO authentication function and the password authentication function.

5. Processing Procedure

Figure 10:
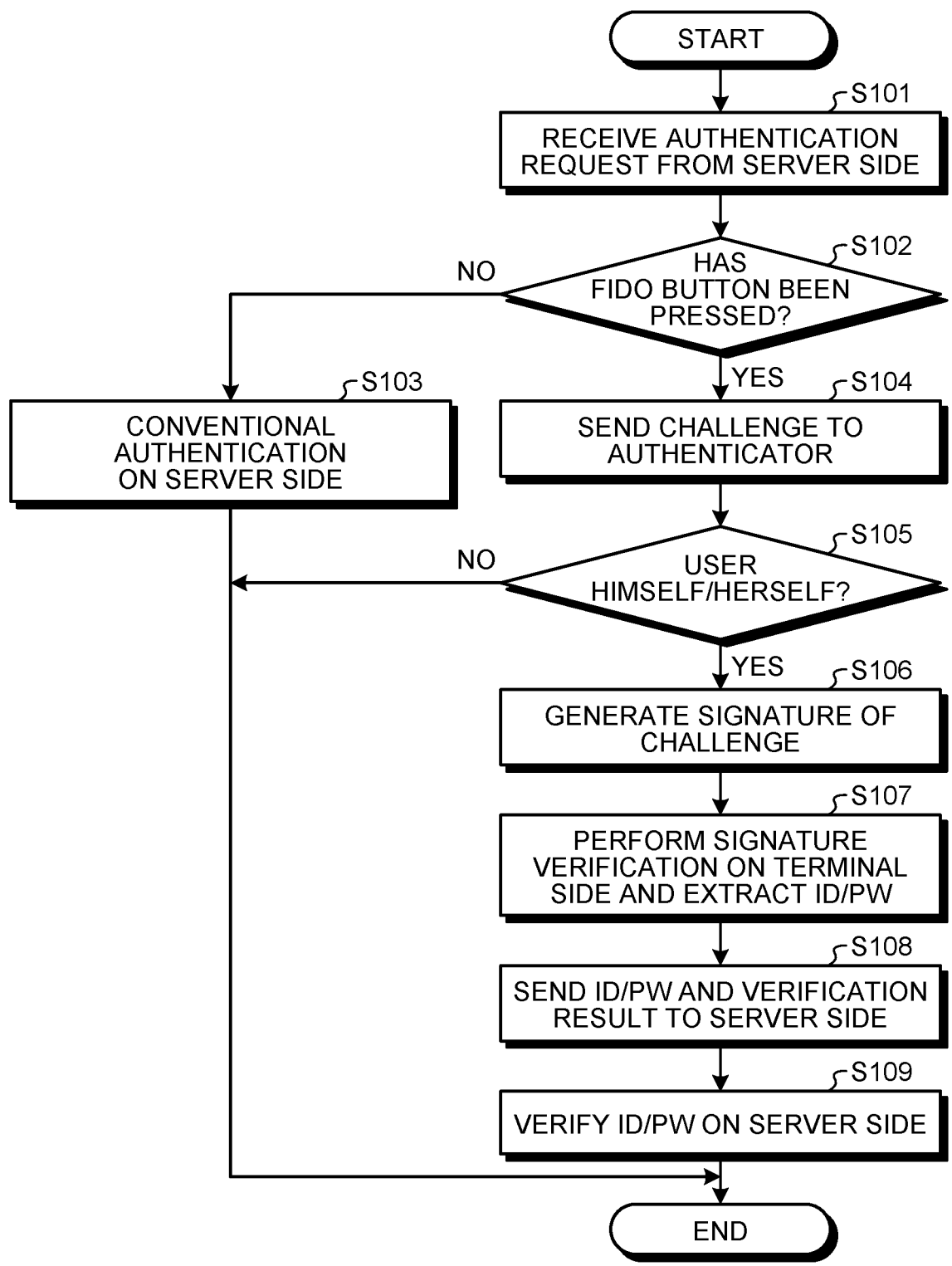
FIG. 10 is a flowchart illustrating a processing procedure according to an embodiment.

Next, a processing procedure by the terminal device 10, the FIDO authenticator 50, and the authentication server 100 according to the embodiment will be described with reference to FIG. 10. FIG. 10 is a flowchart illustrating the processing procedure according to the embodiment. Note that the following processing procedure is repeatedly executed by the control unit 30 of the terminal device 10, the FIDO authenticator 50, and the control unit 130 of the authentication server 100.

As illustrated in FIG. 10, the receiver 32 of the terminal device 10 receives the authentication request from the authentication server 100 via the communication unit 11 (Step S101). At this time, the receiver 32 may receive the challenge or the second challenge and the server information together with the authentication request from the authentication server 100.

Subsequently, the authentication processor 34 of the terminal device 10 displays a FIDO button for executing the FIDO authentication on the terminal side by the browser extension function together with the password screen for inputting the ID and the password of the user U, and determines whether the FIDO button has been pressed (Step S102).

Here, in a case where the FIDO button is not pressed and the ID and the password of the user U are input on the password screen (Step S102: No), the authentication processor 34 (or the transmitter 31) of the terminal device 10 sends only the ID and the password of the user U to the authentication server 100, and the authentication server 100 side performs the conventional authentication (Step S103). Note that, even in a case where a password manager compatible with FIDO is not implemented in the terminal device 10, the FIDO button is not displayed, and thus the authentication server 100 performs the conventional authentication. At this time, it is preferable that a password having such a number of characters (For example, the number of characters is 16 characters, 32 characters, or more.) that a general user cannot remember is set as the password.

On the other hand, when the FIDO button is pressed (Step S102: Yes), the authentication processor 34 (or the transmitter 31) of the terminal device 10 sends the challenge and the server information to the FIDO authenticator 50 (Step S104). At this time, the authentication processor 34 of the terminal device 10 may generate a challenge. Alternatively, the authentication processor 34 (or the transmitter 31) of the terminal device 10 may send (transfer) the challenge transmitted from the authentication server 100 to the FIDO authenticator 50.

Subsequently, the FIDO authenticator 50 verifies the identity of the user U on the basis of the biological information acquired from the user U, and determines whether the user U is the authentic person (Step S105). At this time, in a case where the FIDO authenticator 50 determines that the user U is not the person himself/herself (Step S105: No), the FIDO authenticator 50 notifies the terminal device 10 of the authentication failure, and ends the series of processing. In this case, the authentication processor 34 of the terminal device 10 may normally receive the input of the ID and the password from the user U, transmit the ID and the password of the user U to the authentication server 100 by the password sending function 34A, and perform the conventional authentication on the side of the authentication server 100.

Subsequently, in a case where it is determined that the user U is the authentic person (Step S105: Yes), the FIDO authenticator 50 generates a signature (electronic signature) of the challenge using the private key, and sends the signature and the public key for the challenge to the terminal device 10 (Step S106). At this time, when the key pair of the private key and the public key is not registered in advance in the FIDO authenticator 50 and the terminal device 10, the FIDO authenticator 50 first generates a key pair of a private key and a public key for each authentication server based on the server information, and registers the private key in association with the server information. Further, if the key pair has been registered (for example, second and subsequent times), the FIDO authenticator 50 extracts (detects) the registered private key.

Subsequently, the authentication processor 34 of the terminal device 10 performs signature verification (including verification of the challenge) by the FIDO server function 34C, and extracts the ID and the password of the user U from the memory area 40A (Step S107). At this time, the authentication processor 34 of the terminal device 10 may manage the ID and the password of the user U for each authentication server by the password management function 34B, extract the ID and the password of the user U from the memory area 40A inside the terminal device 10 based on the server information, and automatically input the ID and the password in the input field of the password screen. Note that when the public key is sent from the FIDO authenticator 50, the authentication processor 34 registers the public key in the memory area 40A inside the terminal device 10 by the password management function 34B.

Subsequently, the transmitter 31 of the terminal device 10 sends the ID and password of the user U and the authentication result of the signature to the authentication server 100 via the communication unit 11 (Step S108). At this time, the authentication result of the signature may include a challenge with a signature corresponding to the challenge sent from the authentication server 100. Alternatively, a signed second challenge corresponding to the second challenge sent from the authentication server 100 may be included. At this time, in a case where the key pair of the private key and the public key used for the signature of the second challenge is not registered in advance in the terminal device 10 and the authentication server 100, the authentication processor 34 of the terminal device 10 may first generate a key pair of the private key and the public key by the FIDO server function 34C and generate a signature with the private key for the second challenge transmitted from the authentication server 100. Then, the transmitter 31 of the terminal device 10 may send the signed second challenge and the public key to the authentication server 100.

Subsequently, the verification unit 133 of the authentication server 100 verifies the ID and password of the user U (Step S109). At this time, the verification unit 133 of the authentication server 100 may verify the challenge with a signature or the signed second challenge returned as a response from the terminal device 10.

6. Modification Example

The terminal device 10 and the authentication server 100 described above may be implemented in various different modes other than the above embodiment. Therefore, a modification example of the embodiment will be described below.

In the above embodiment, a part or all of the processing executed by the authentication server 100 may actually be executed by the terminal device 10. For example, the processing may be completed in a stand-alone manner (by the terminal device 10 alone). In this case, it is assumed that the terminal device 10 has the function of the authentication server 100 in the above embodiment. Further, in the above embodiment, since the terminal device 10 cooperates with the authentication server 100, it seems that the terminal device 10 also executes the processing of the authentication server 100 from the viewpoint of the user U. That is, from another point of view, it can be said that the terminal device 10 includes the authentication server 100.

Furthermore, in the above embodiment, the sensor unit 20 (each of the sensors 21 to 28) of the terminal device 10 may be used as the FIDO authenticator 50. In this case, the terminal device 10 also functions as the FIDO authenticator 50. For example, the terminal device 10 estimates the context (situation) of the user U on the basis of the sensor information indicating the detection result of the sensor unit 20. Then, the terminal device 10 performs user verification using context information of the user U instead of/in addition to the biological information of the user U. The context information of the user U may be any one of or a combination of behavior such as acceleration and angular velocity, surrounding daily sounds, temperature/humidity/illuminance of a location, positional information, and the like.

7. Effects

As described above, the terminal device 10 according to the present application includes a sending unit that sends the challenge to the authenticator, a reception unit that receives the challenge with a signature and the public key from the authenticator, a verification unit that performs signature verification using the public key, and a providing unit that provides the verification result of the signature to the authentication server 100.

Further, the reception unit receives an authentication request for the ID and password of the user U from the authentication server 100. Then, the providing unit provides the authentication server 100 with the verification result of the signature together with the ID and the password of the user U.

Furthermore, when the verification request button displayed on the password screen for inputting the ID and the password of the user U is pressed, the sending unit sends the challenge to the authenticator. Then, in a case where the verification request button is pressed, the providing unit provides the verification result of the signature to the authentication server 100 together with the ID and the password of the user U, and in a case where the verification request button is not pressed, the providing unit provides only the ID and the password of the user U to the authentication server 100.

Furthermore, the reception unit receives the challenge sent from the authentication server 100. Next, the sending unit sends the challenge sent from the authentication server 100 to the authenticator. Then, the providing unit returns the challenge with a signature to the authentication server 100 as a response together with the verification result of the signature.

In addition, the reception unit receives the second challenge sent from the authentication server 100. Next, the sending unit sends a challenge different from the second challenge to the authenticator. Next, the receiving unit receives the challenge with a signature and the public key from the authenticator. Next, in a case where the authentication is successful as a result of performing the signature verification using the public key, the verification unit generates a signature of the second challenge. Then, the providing unit returns the signature of the second challenge to the authentication server 100 as a response.

Furthermore, the providing unit indicates the integrity of the terminal device 10 by the signature of the second challenge.

Further, the providing unit provides the verification result of the signature to the authentication server 100 having both the FIDO authentication function and the password authentication function.

Furthermore, the providing unit represents that the FIDO authentication is completed by providing the verification result of the signature.

Further, the authentication server 100 according to the present application includes a sending unit that makes an authentication request to the terminal device 10, an acquisition unit that receives a verification result of the signature generated by the authenticator together with the ID and the password of the user U from the terminal device 10, and a verification unit that determines that the FIDO authentication is completed based on the verification result of the signature and verifies the ID and the password of the user U.

Further, the sending unit sends the challenge to the terminal device 10. Next, the acquisition unit receives, from the terminal device 10, the challenge for which the signature is generated by the authenticator as a response together with the verification result of the signature. Then, the verification unit verifies the challenge sent as a response from the terminal device 10.

Furthermore, the sending unit sends the second challenge to the terminal device 10. Next, the acquisition unit receives a signature of the second challenge generated by the terminal device 10 as a response from the terminal device 10 that has performed the FIDO authentication. Then, the verification unit verifies the signature of the second challenge sent as a response from the terminal device 10.

Further, the verification unit has both the FIDO authentication function and the password authentication function.

By any one or a combination of the above-described processes, the information processing device (the terminal device 10 and the authentication server 100) according to the present application can realize an authentication method in which the FIDO authentication for accessing an external server and the password authentication coexist. In addition, the authentication server having both the FIDO authentication function and the password authentication function can provide authentication without altering the interface by the password. For example, the FIDO authentication can be activated through a UI screen of an existing password, information of an authentication result can be sent and received, and the FIDO authentication can be introduced in addition to the password authentication without modifying an authentication interface.

8. Hardware Configuration

Further, the terminal device 10 and the authentication server 100 according to the above-described embodiment are realized by, for example, a computer 1000 having a configuration as illustrated in FIG. 11. Hereinafter, the authentication server 100 will be described as an example. FIG. 11 is a diagram illustrating an example of a hardware configuration. The computer 1000 is connected to an output device 1010 and an input device 1020, and has a form in which an arithmetic device 1030, a primary storage device 1040, a secondary storage device 1050, an output interface (I/F) 1060, an input I/F 1070, and a network I/F 1080 are connected by a bus 1090.

The arithmetic device 1030 operates on the basis of a program stored in the primary storage device 1040 or the secondary storage device 1050, a program read from the input device 1020, or the like, and executes various processes. The arithmetic device 1030 is realized by, for example, a central processing unit (CPU), a micro processing unit (MPU), an application specific integrated circuit (ASIC), a field programmable gate array (FPGA), or the like.

The primary storage device 1040 is a memory device such as a random access memory (RAM) that temporarily stores data used for various operations by the arithmetic device 1030. Further, the secondary storage device 1050 is a storage device in which data used for various arithmetic operations by the arithmetic device 1030 and various databases are registered, and is realized by a read only memory (ROM), a hard disk drive (HDD), a solid state drive (SSD), a flash memory, or the like. The secondary storage device 1050 may be a built-in storage or an external storage. Further, the secondary storage device 1050 may be a removable storage medium such as a universal serial bus (USB) memory or a secure digital (SD) memory card. Furthermore, the secondary storage device 1050 may be a cloud storage (online storage), a network attached storage (NAS), a file server, or the like.

The output I/F 1060 is an interface for transmitting information to be output to the output device 1010 that outputs various types of information such as a display, a projector, and a printer, and is realized by, for example, a connector of a standard such as a universal serial bus (USB), a digital visual interface (DVI), or a high definition multimedia interface (HDMI) (registered trademark). Furthermore, the input I/F 1070 is an interface for receiving information from various input devices 1020 such as a mouse, a keyboard, a keypad, a button, a scanner, and the like, and is realized by, for example, a USB or the like.

In addition, the output I/F 1060 and the input I/F 1070 may be wirelessly connected to the output device 1010 and the input device 1020, respectively. That is, the output device 1010 and the input device 1020 may be wireless devices.

Furthermore, the output device 1010 and the input device 1020 may be integrated like a touch panel. In this case, the output I/F 1060 and the input I/F 1070 may also be integrated as the input/output I/F.

Note that the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like.

The network I/F 1080 receives data from another device via the network N and transmits the data to the arithmetic device 1030, and transmits data generated by the arithmetic device 1030 to another device via the network N.

The arithmetic device 1030 controls the output device 1010 and the input device 1020 via the output I/F 1060 and the input I/F 1070. For example, the arithmetic device 1030 loads a program from the input device 1020 or the secondary storage device 1050 onto the primary storage device 1040, and executes the loaded program.

For example, in a case where the computer 1000 functions as the authentication server 100, the arithmetic device 1030 of the computer 1000 realizes the function of the control unit 130 by executing a program loaded on the primary storage device 1040. Further, the arithmetic device 1030 of the computer 1000 may load a program acquired from another device via the network I/F 1080 onto the primary storage device 1040 and execute the loaded program. Furthermore, the arithmetic device 1030 of the computer 1000 may cooperate with another device via the network I/F 1080, and may call a function, data, and the like of the program from another program of another device to use.

9. Others

Although the embodiments of the present application have been described above, the present invention is not limited by the contents of these embodiments. Further, the above-described constituent elements include those that can be easily assumed by those skilled in the art, those that are substantially the same, and those in a so-called equivalent scope. Furthermore, the above-described constituent elements can be appropriately combined. Furthermore, various omissions, substitutions, or changes in the constituent elements can be made without departing from the gist of the above-described embodiments.

Among the processes described in the above embodiments, all or a part of the processes described as being performed automatically can be performed manually, or all or a part of the processes described as being performed manually can be performed automatically by a known method. In addition, the processing procedure, specific name, and information including various data and parameters illustrated in the document and the drawings can be arbitrarily changed unless otherwise specified. For example, the various types of information illustrated in each drawing are not limited to the illustrated information.

Further, each constituent element of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

For example, the above-described authentication server 100 may be realized by a plurality of server computers, and depending on functions, the configuration can be flexibly changed such that an external platform or the like is called by an application programming interface (API), network computing, or the like to be realized.

Furthermore, the above-described embodiments and modification example can be appropriately combined within a range that does not contradict processing contents.

In addition, the "Part (section, module, unit)" described above can be read as "means", "circuit", or the like. For example, the acquisition unit can be replaced with an acquisition means or an acquisition circuit.

According to one aspect of the embodiment, there is an effect that it is possible to provide information matching the user's wish.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device comprising:
 a communication unit connected to a network; and
 a processor, wherein the processor is configured to:
  send a challenge to an authenticator;
  receive the challenge with a signature and a public key from the authenticator;

perform signature verification using the public key;
directly provide a verification result of the signature to an authentication server via the communication unit;
receive a first challenge sent from the authentication server via the communication unit;
send a second challenge different from the first challenge to the authenticator;
receive a signature of the second challenge and a public key from the authenticator;
generate a signature of the first challenge when authentication is successful as a result of performing signature verification using the public key; and
return the signature of the first challenge to the authentication server via the communication unit as a response.

2. The terminal device according to claim 1, wherein the processor is further configured to:
receive an authentication request of an ID and a password of a user from the authentication server via the communication unit, and
provide the authentication server with the verification result of the signature together with the ID and the password of the user via the communication unit.

3. The terminal device according to claim 2, wherein the processor is further configured to:
send a challenge to the authenticator when a verification request button displayed on a password screen for inputting an ID and a password of the user is pressed, and
provide the authentication server with the verification result of the signature together with the ID and the password of the user via the communication unit when the verification request button is pressed, and provides only the ID and the password of the user to the authentication server via the communication unit when the verification request button is not pressed.

4. The terminal device according to claim 1, wherein the processor is further configured to:
receive a challenge sent from the authentication server via the communication unit,
send the challenge sent from the authentication server to the authenticator, and
return the challenge with the signature to the authentication server via the communication unit as a response together with the verification result of the signature.

5. The terminal device according to claim 1, wherein the processor is further configured to:
indicate integrity of the terminal device by the signature of the first challenge.

6. The terminal device according to claim 1, wherein the processor is further configured to:
provide the verification result of the signature to the authentication server having both a FIDO authentication function and a password authentication function via the communication unit.

7. The terminal device according to claim 6, wherein the processor is further configured to:
represent that the FIDO authentication function is completed by providing the verification result of the signature.

8. An authentication server comprising:
a communication unit connected to a network; and
a processor, wherein the processor is configured to:
make an authentication request to a terminal device via the communication unit;
receive, directly from the terminal device via the communication unit, a verification result of a signature generated by an authenticator together with an ID and a password of a user;
determine that FIDO authentication is completed with the verification result of the signature, and verify the ID and the password of the user;
send a first challenge to the terminal device via the communication unit, wherein the terminal device issues a second challenge to the authenticator following receipt of the first challenge, and receives a signature of the second challenge and a public key from the authenticator;
receive a signature of the first challenge generated by the terminal device as a response from the terminal device that has performed the FIDO authentication; and
verify the signature of the first challenge sent from the terminal device as a response,
wherein the signature of the first challenge is generated when authentication is successful as a result of performing signature verification using the public key.

9. The authentication server according to claim 8, wherein the processor is further configured to:
send a third challenge to the terminal device via the communication unit,
receive, from the terminal device via the communication unit, a challenge in which a signature is generated by the authenticator together with the verification result of the signature as a response, and
verify the challenge sent from the terminal device via the communication unit as a response.

10. The authentication server according to claim 8, wherein
the processor has both a FIDO authentication function and a password authentication function.

11. An authentication method executed by a terminal device, the method comprising:
a receiving step of receiving a first challenge sent from an authentication server via a communication unit connected to a network;
a sending step of sending a second challenge different from the first challenge to an authenticator;
a reception step of receiving the second challenge with a signature and a public key from the authenticator;
a verification step of performing signature verification using the public key;
a generation step of generating a signature of the first challenge when the signature verification is successful; and
a providing step of directly providing the signature of the first challenge to the authentication server as a response.

12. An authentication method executed by an authentication server, the method comprising:
a sending step of making an authentication request to a terminal device via a communication unit connected to a network;
an acquisition step of receiving, directly from the terminal device via the communication unit, a verification result of a signature generated by an authenticator together with an ID and a password of a user;
a verification step of determining that FIDO authentication is completed with the verification result of the signature, and verifying the ID and the password of the user;
a sending step of sending a first challenge to the terminal device via the communication unit, wherein the terminal device issues a second challenge to the authenticator following receipt of the first challenge, and receives a signature of the second challenge and a public key from the authenticator;
a receiving step of receiving a signature of the first challenge generated by the terminal device as a response from the terminal device that has performed the FIDO authentication; and
a verification step of verifying the signature of the first challenge sent from the terminal device as a response,
wherein the signature of the first challenge is generated when authentication is successful as a result of performing signature verification using the public key.

13. An authentication program causing a computer that functions as a terminal device to execute:
 a sending procedure of sending a first challenge to an authenticator;
 a reception procedure of receiving the first challenge with a signature and a public key from the authenticator;
 a verification procedure of performing signature verification using the public key;
 a providing procedure of directly providing a verification result of the signature to an authentication server via a communication unit connected to a network;
 a receiving procedure of receiving a second challenge sent from the authentication server via the communication unit;
 a sending procedure of sending a third challenge different from the second challenge to the authenticator;
 a receiving procedure of receiving a signature of the third challenge and a public key from the authenticator;
 a generating procedure of generating a signature of the second challenge when authentication is successful as a result of performing signature verification using the public key; and
 a transmitting procedure of returning the signature of the second challenge to the authentication server via the communication unit as a response.

14. A non-transitory computer-readable storage medium that stores an authentication program causing a computer that functions as an authentication server to execute:
 a sending procedure of making an authentication request to a terminal device via a communication unit connected to a network;
 an acquisition procedure of receiving, directly from the terminal device via the communication unit, a verification result of a signature generated by an authenticator together with an ID and a password of a user;
 a verification procedure of determining that FIDO authentication is completed with the verification result of the signature, and verifying the ID and the password of the user;
 a sending procedure of sending a first challenge to the terminal device via the communication unit, wherein the terminal device issues a second challenge to the authenticator following receipt of the first challenge, and receives a signature of the second challenge and a public key from the authenticator;
 a receiving procedure of receiving a signature of the first challenge generated by the terminal device as a response from the terminal device that has performed the FIDO authentication; and
 a verification procedure of verifying the signature of the first challenge sent from the terminal device as a response,
wherein the signature of the first challenge is generated when authentication is successful as a result of performing signature verification using the public key.

* * * * *